US012585628B2

(12) United States Patent
Mullenix et al.

(10) Patent No.: US 12,585,628 B2
(45) Date of Patent: Mar. 24, 2026

(54) GEOSPATIAL ANOMALY FILTERING OF GEOLOCATION DATA STREAMS

(71) Applicant: Zartico, Inc., Salt Lake City, UT (US)

(72) Inventors: Alan Mullenix, South Jordan, UT (US); Alexandra V. Pasi, South Jordan, UT (US)

(73) Assignee: Zartico, Salt Lake City, UT (US)

( * ) Notice: Subject to any disclaimer, the term of this patent is extended or adjusted under 35 U.S.C. 154(b) by 0 days.

(21) Appl. No.: 19/195,877

(22) Filed: May 1, 2025

(65) Prior Publication Data

US 2025/0342140 A1     Nov. 6, 2025

Related U.S. Application Data

(60) Provisional application No. 63/641,528, filed on May 2, 2024.

(51) Int. Cl.
*G06F 16/00* (2019.01)
*G06F 16/215* (2019.01)
*G06F 16/29* (2019.01)

(52) U.S. Cl.
CPC ............ *G06F 16/215* (2019.01); *G06F 16/29* (2019.01)

(58) Field of Classification Search
CPC ............................... G06F 16/215; G06F 16/29
See application file for complete search history.

(56) References Cited

U.S. PATENT DOCUMENTS

2023/0345205 A1* 10/2023 Adams ................... H04W 4/029
2024/0144160 A1*  5/2024 Deshpande ......... H04W 64/006

FOREIGN PATENT DOCUMENTS

AU        2021358857 A1 *  5/2023   ............. A01G 25/16

OTHER PUBLICATIONS

Zartico, YouTube Video—Zartico Short Cuts: Hot Spots Retrieved from the Internet: https://www.youtube.com/watch?v=FqDtP2RMfgl, 1 page, May 4, 2023.
Zartico, Press Release—Zartico Introduces Hot Spot Filtering to Geolocation Stream Retrieved from the Internet: https://www.zartico.com/announcements/zartico-introduces-hot-spot-filtering, 4 pages, Jun. 5, 2023.
Pasi, Alexandra V., White Paper—Eliminating Hotspot Anomalies to Improve Data Reliability, 6 pages, Jun. 5, 2023.

* cited by examiner

*Primary Examiner* — Dinku W Gebresenbet
(74) *Attorney, Agent, or Firm* — Woodard, Emhardt, Henry, Reeves & Wagner, LLP

(57)          ABSTRACT

A system and method for filtering anomalies from geospatial data has been developed. Geospatial data is typically collected from various user devices and aggregated by third party services. The method is agnostic of the cause of anomalies and generalized to effectively filter the geospatial data regardless of the type of anomalies in the data. The method involves determining a probability that data pings in the geospatial data are anomalous at a particular location. The probability is calculated based on a density threshold condition that describes the distribution of data pings within a section of the overall geographic area. Data pings that have a high probability of being anomalous are removed from the geospatial data. The method involves passing the data through a filter multiple times.

11 Claims, 11 Drawing Sheets

100

Data Refiner — 105

Operating System — 125

110 — Network

User Device

115

Third Party Data Broker

120

User Device

115

105

500

505   Receiving geospatial data recorded through user devices

510   Passing the geospatial data through a flat filter

515   Passing the geospatial data through a probabilistic filter

520   Passing the geospatial data through a time-based filter

525   Filtering the geospatial data based on point-to-point movement of a device

600

800

805   Dividing geospatial data into distinct geographic areas

810   Passing the geospatial data in an area through a filter

815   Is number of filter passes less than desired number of passes?

Yes

820   Dividing the geospatial data for an area into smaller sub-areas

GEOSPATIAL ANOMALY FILTERING OF GEOLOCATION DATA STREAMS

CROSS REFERENCE TO RELATED APPLICATIONS

This application claims the benefit of U.S. Patent Application No. 63/641,528, filed May 2, 2024, which is hereby incorporated by reference.

BACKGROUND

With the advent of smartphones and other personal devices, geolocation data has become more prevalently used as well as more valuable. For example, geolocation data can be used for planning purposes and making decisions. However, any decision or other activity depending on the geolocation data is only as valuable to the extent that the geolocation data is reliably accurate.

Thus, there is a need for improvement in this field.

SUMMARY

Geolocation data is used in a variety of applications such as to estimate attendance at events, observe traffic in cities, plan public projects, and/or predict fluctuations in population among other examples. Geolocation data is typically obtained from various user devices, including smartphones, laptops, fitness devices, GPS systems, and/or other types of devices. In some cases, location data of a user is recorded through one or more applications on such a device. For example, social media, navigation, ride-sharing, fitness, and/or other types of applications can record user location data. Often times, businesses that oversee, maintain, and/or operate such applications and/or devices sell such location data to other entities, such as governments and/or other businesses. In some cases, third-party data brokers may accumulate user data from multiple businesses and/or applications. These data brokers typically sell this data to other businesses, governments, and/or other entities, but the quality of the data can sometimes be suspect.

In the travel and tourism industry, it is always helpful to comprehend where and when visitors travel to certain destinations within a locale. With the advent of smartphones and other technologies, this ability to comprehend the visitor experience has been realized. Travel and destination organizations are now able to visualize trends and pinpoint opportunities based on anonymized geospatial or geolocation data. Such data is typically gathered from a variety of sources, like different smartphone apps, through third-party data brokers. Each smartphone app may collect geolocation, temporal, and other information differently from one another and at different accuracies so as to create anomalies. For instance, some location data may be collected using generally accurate Global Positioning System (GPS) data and other data may rely on less accurate cellphone tower location information. Likewise, the data brokers may introduce anomalies when processing the data from different sources. For example, due to how the data is processed from disparate sources, an ammonized user may appear to instantly teleport between two geographically distant locations. With these anomalies, it is hard to determine which information is accurate and which is not. While humans sometimes have an uncanny ability to discern some anomalies, but not all, it is impractical in most cases to use humans to remove these anomalies due to the sheer size of the data.

A unique system and method for filtering anomalies from geolocation data has been developed. Once more, many devices and/or applications on devices record user data, including geospatial and temporal data about users. In some cases, the geospatial and/or temporal data does not represent a precise location and time for an anonymized user. For example, the geospatial data can include approximations about a location of a user and/or modify the precise location of a user in other ways. Such approximations and/or modifications can cause anomalies in geospatial data collected from multiple users. Moreover, third-party data brokers tend to aggregate geolocation and temporal data from a variety of sources like different smartphone apps. While not certain, it is theorized that the processing of this data by the data brokers can introduce systematic errors in the geospatial and temporal data. In one example, one or more anomalies are in the form of a hotspot where an excessive amount of data points are tied to one location or geographic area. The amount of data points at a hotspot typically dominates the number of data points at other locations. Hotspots and/or other anomalies generally inhibit or prevent accurate analysis of geospatial data from users. The system has been designed to generally filter out such anomalies to provide more precise data. Moreover, the system uses a technique that is generally agnostic to how the data was collected. This approach is therefore more robust to any changes to how smartphone apps or other sources collect the data.

In one form, the system generally includes a data refiner. The data refiner is configured to read and analyze data. In one example, the data refiner is a remote server and/or a network of computers. In another example, the data refiner is a personal computer or other such device. The data refiner includes an operating system. The operating system typically stores and executes algorithms or software. For example, the operating system includes one or more algorithms or programs for filtering data. The data refiner is communicatively coupled to a network. In one example, the network includes the internet, a mobile network, and/or another type of network. The system generally further includes a user device and a third-party data broker. The user device can for example include a mobile phone, personal computer, navigational device, and/or other types of device. The third-party broker system generally includes one or more computers, such as a remote server and/or a database. The user device and the third-party data broker system are operatively connected to one another over the network. In one example, the user device is configured to communicate with the data refiner over the network, such as to send geospatial temporal, and other data from a user. In another example, the user device is configured to communicate with the third-party data broker system over the network, and the third-party system is configured to communicate with the data refiner. For instance, the third party may collect data from multiple user devices and send the aggregated data to the data refiner.

The system is configured to perform a method or technique for filtering anomalies from the data. One or more parts of the system perform various parts of the method. For example, the data refiner is configured to perform one or more parts of the method. Further, different parts of the data refiner may perform one or more parts of the method. For instance, a processor and/or memory in the data refiner perform one or more parts of the method. Further, the operating system generally stores and/or executes one or more parts of the method. For instance, the operating system includes one or more filters in the form of an algorithm or other software. The method generally involves filtering geospatial data, such as from multiple user devices. The method provides a generalized solution that supports filtering data from a variety of sources and/or data that is modified in various ways. In one example, the method includes filtering approximate location observations from a user device while retaining precise location observations from the user device. Typically, the geospatial data is organized into cells and includes data pings. Each cell represents a geographic area. Each data ping refers to a location of a user device that is observed at a particular instance. The cells are further divided into one or more levels of subcell divisions. In one version, each data ping includes information about a latitude and a longitude. The latitude and the longitude specify the location tied to the data ping. In one example, the system defines multiple cells and/or divides the data pings into multiple cells based on location.

The method further includes comparing the number of data pings in each subcell division and/or particular location within a cell to the total number of data pings within the area of the cell. Analyzing the data pings based on each cell allows the system to be dynamic and adapt to different sets of geospatial data. The system typically utilizes a multi-pass filter that passes through the data multiple times. In one version, the system analyzes a smaller area within the cell during successive passes of the multi-pass filter. For instance, the multi-pass filter analyzes the entire cell area during a first pass. On a second pass, the multi-pass filter analyzes each subcell division within the cell separately. The number of passes through the multi-pass filter can be determined in a variety of ways. In one example, the number of passes is tuned to be a specific number. In another example, the number of passes is determined in a dynamic way that changes based on the data being filtered. Using multiple passes supports the system to remove anomalies that may be overshadowed by larger anomalies. For example, large hotspots may hinder the system from identifying other hotspots on the same pass. Further, dividing the data pings into cells supports performing calculations on multiple cells in parallel. For instance, the system supports filtering through parallel processing across multiple computing cores and/or clusters.

The system then calculates a probability that the pings at one position and/or in a given subcell division are anomalous. For example, the system determines such a probability for the data pings in each subcell division within a given cell. Calculating probability includes comparing the observed distribution of data pings to a normal distribution and/or a binomial distribution. After determining the probability, the system compares the probability to a threshold. If the probability is above the threshold, the system discards the data pings. In one example, the system discards all data pings in a subcell division and/or at a latitude and longitude if the probability is above the threshold. Alternatively or additionally, the system determines a maximum allowed ping count for a subcell division based on the probability threshold and filters the pings in each subcell division based on the maximum ping count. The threshold for the probability that the pings are anomalous is typically high. In one example, the threshold is 95%. In other words, the system discards data pings that have a less than 5% of being natural. Using such a threshold ensures that the precise user data is retained.

The probability is calculated based on a density threshold condition. The density threshold facilitates using a high probability threshold while still eliminating anomalies such as hotspots. As mentioned, using a high probability threshold helps to retain precise location data from users. In one example, the density threshold is a maximum ping count allowed in each subcell division within a cell. The system performs regression on the density threshold condition. Using regression analysis on the density threshold condition allows the system to characterize the performance of the probability filter. For example, the regression analysis allows the system to determine how aggressive the filter discards concentrated data pings. Further, the system utilizes a flat filter that discards data pings that are concentrated at a location in an excessive way. Using a flat filter helps to remove extreme anomalies before filtering the data in other ways. The flat filter typically has a high threshold so as to avoid discarding data from natural hotspots, such as airports or attractions. In one example, the flat filter is implemented before using the multi-pass filter. The flat filter enables the multi-pass filter to remove anomalous data reliably by first removing large anomalies that overshadow the rest of the data.

In one version, the system generally filters anomalies from the data based on a geographic density of data pings. In another version, the system filters anomalies from the data based on a time the data ping is observed. In one example, the system observes geospatial data across a set period of time. The system in other variations filters anomalies based on the amount of time the anomaly is observed. For instance, the system can discard data pings that have been observed for an unnatural length of time. In another example, the system observes changes in the position of a user over time. The system in further versions filters out changes in location that are unnatural. For example, the system can discard data pings that represent a user traveling large distances in a single instant. The system is configured to utilize any combination of filtering styles to remove anomalies from the data.

Generally, the system filters anomalous data in an approximate way to the way a human naturally filters out anomalous data. For instance, the system can pick out hotspots in the same way a human eye picks out a hotspot on a visual data map. In one example, the system utilizes artificial intelligence techniques to analyze anomalies in the data. In another example, the system utilizes one or more models that describe the natural movement of individuals in a large group. For instance, the system utilizes mean field game theory techniques to analyze anomalous data.

The systems and techniques as described and illustrated herein concern a number of unique and inventive aspects. Some, but by no means all, of these unique aspects are summarized below.

Aspect 1 generally concerns a method.

Aspect 2 generally concerns the method of any previous aspect including filtering anomalies from data.

Aspect 3 generally concerns the method of any previous aspect in which the data includes geospatial data.

Aspect 4 generally concerns the method of any previous aspect including filtering approximate location observations from a device while retaining precise location observations.

Aspect 5 generally concerns the method of any previous aspect in which the geospatial data is organized into cells that represent geographic areas.

Aspect 6 generally concerns the method of any previous aspect including comparing a number of data pings at a smaller area within a cell to a total number of data pings in the cell.

Aspect 7 generally concerns the method of any previous aspect including using a multi-pass filter that passes through the data multiple times.

Aspect 8 generally concerns the method of any previous aspect including checking a smaller area within the cell on successive passes of the multi-pass filter.

Aspect 9 generally concerns the method of any previous aspect including applying a flat filter to eliminate extreme anomalies.

Aspect 10 generally concerns the method of any previous aspect including applying the flat filter before the multi-pass filter.

Aspect 11 generally concerns the method of any previous aspect in which the number of passes is tuned to a specific number.

Aspect 12 generally concerns the method of any previous aspect in which the number of passes is determined dynamically based on the data.

Aspect 13 generally concerns the method of any previous aspect including calculating a probability that the data pings at the smaller area within the cell are anomalous.

Aspect 14 generally concerns the method of any previous aspect including discarding pings if the probability is above a threshold.

Aspect 15 generally concerns the method of any previous aspect in which the probability threshold is 95%.

Aspect 16 generally concerns the method of any previous aspect in which the probability is calculated based on the density threshold condition.

Aspect 17 generally concerns the method of any previous aspect including performing regression on the density threshold condition.

Aspect 18 generally concerns the method of any previous aspect including comparing a distribution of data pings to a normal distribution.

Aspect 19 generally concerns the method of any previous aspect including performing filtering calculations for multiple cells in parallel.

Aspect 20 generally concerns the method of any previous aspect including observing geospatial data over a period of time.

Aspect 21 generally concerns the method of any previous aspect including filtering anomalies based on an amount of time the anomaly is observed.

Aspect 22 generally concerns the method of any previous aspect including observing changes in location of a user.

Aspect 23 generally concerns the method of any previous aspect including filtering changes in location that are unnatural.

Aspect 24 generally concerns the method of any previous aspect including filtering anomalies based on a geographic density of data pings.

Aspect 25 generally concerns the method of any previous aspect in which the data includes temporal data from anonymized users.

Aspect 26 generally concerns the method of any previous aspect in which the data includes geolocation data from anonymized users.

Aspect 27 generally concerns the method of any previous aspect including receiving the data from a third-party data broker.

Aspect 28 generally concerns the method of any previous aspect including filtering based on mean field game theory.

Aspect 29 generally concerns the method of any previous aspect in which the filtering approximates filtering performance of a human.

Aspect 30 generally concerns a system.

Aspect 31 generally concerns the system of any previous aspect including a computer with a processor and memory.

Aspect 32 generally concerns the system of any previous aspect in which the computer has software.

Aspect 33 generally concerns the system of any previous aspect in which the software is configured to filter anomalies from geospatial data.

Aspect 34 generally concerns the system of any previous aspect in which the computer includes an operating system.

Aspect 35 generally concerns the system of any previous aspect in which the operating system includes a filter.

Aspect 36 generally concerns the method of any previous aspect in which the density threshold condition represents a limit on the density of data pings in a geographic area.

Aspect 37 generally concerns the method of any previous aspect in which the geospatial data includes multiple data pings.

Aspect 38 generally concerns the method of any previous aspect in which the data ping includes a location for a user device.

Aspect 39 generally concerns the method of any previous aspect including removing data pings that include an approximate location for a user device.

Aspect 40 generally concerns the method of any previous aspect including retaining data pings that include a precise location for a user device.

Aspect 41 generally concerns the method of any previous aspect including passing the geospatial data through a flat filter.

Aspect 42 generally concerns the method of any previous aspect in which the flat filter removes data pings at locations where the number of data pings is above a ping threshold.

Aspect 43 generally concerns the method of any previous aspect in which the ping threshold is above 100 data pings.

Aspect 44 generally concerns the method of any previous aspect including observing geospatial data recorded at multiple points in time.

Aspect 45 generally concerns the method of any previous aspect including determining a probability that data pings at a location are anomalous for multiple points in time.

Aspect 46 generally concerns the method of any previous aspect including flagging data pings having a probability to be anomalous that is above a probability threshold.

Aspect 47 generally concerns the method of any previous aspect including removing data pings that are flagged at points in time spanning beyond a time threshold.

Aspect 48 generally concerns the method of any previous aspect in which the time threshold is at least one day.

Aspect 49 generally concerns the method of any previous aspect including removing data pings that are flagged across a continuous span of points in time.

Aspect 50 generally concerns the method of any previous aspect including removing data pings that have a probability above a probability threshold.

Aspect 51 generally concerns the method of any previous aspect including passing the geospatial data through a probabilistic filter.

Aspect 52 generally concerns the method of any previous aspect including filtering anomalies from geospatial data.

Aspect 53 generally concerns the method of any previous aspect including observing geospatial data.

Aspect 54 generally concerns the method of any previous aspect in which the anomalous data pings represent approximate or unnatural locations of the user devices.

Aspect 55 generally concerns the method of any previous aspect including calculating a density threshold condition based on the data pings in the cell.

Aspect 56 generally concerns the method of any previous aspect including dividing the cell into multiple subcells.

Aspect 57 generally concerns the method of any previous aspect including comparing the data pings within the cell to an expected distribution of data pings.

Aspect 58 generally concerns the method of any previous aspect in which the expected distribution is a uniform distribution.

Aspect 59 generally concerns the method of any previous aspect including comparing the data pings within the subcell to an expected distribution of data pings.

Aspect 60 generally concerns the method of any previous aspect including comparing a number of data pings at a location in the subcell to a total number of data pings in the subcell.

Aspect 61 generally concerns the method of any previous aspect including performing calculations for the cells across multiple devices in parallel.

Aspect 62 generally concerns the method of any previous aspect including calculating a density threshold condition based on the data pings in the subcell.

Aspect 63 generally concerns the method of any previous aspect including calculating a probability that data pings at a location are anomalous based on the data pings in the subcell.

Aspect 64 generally concerns the method of any previous aspect including passing the geospatial data through a filter as a first pass.

Aspect 65 generally concerns the method of any previous aspect including organizing the geospatial data into multiple cells that each represent a geographic area.

Aspect 66 generally concerns the method of any previous aspect including filtering anomalies from the geospatial data based on a distribution of data pings in the cell.

Aspect 67 generally concerns the method of any previous aspect including passing the geospatial data through the filter as a second pass.

Aspect 68 generally concerns the method of any previous aspect including organizing the geospatial data into multiple subcells representing geographic areas within each cell.

Aspect 69 generally concerns the method of any previous aspect including filtering anomalies from the geospatial data based on a distribution of data pings in the subcell.

Aspect 70 generally concerns the method of any previous aspect including passing the geospatial data through the filter for one or more additional passes.

Aspect 71 generally concerns the method of any previous aspect including organizing the geospatial data into smaller geographic sections for each additional pass.

Aspect 72 generally concerns the method of any previous aspect including filtering anomalies from the geospatial data on each additional pass based on a distribution of data pings in the smaller geographic section.

Aspect 73 generally concerns the method of any previous aspect including filtering anomalies.

Aspect 74 generally concerns the method of any previous aspect including calculating a density threshold condition on each pass of the filter.

Aspect 75 generally concerns the method of any previous aspect including comparing the data pings within each geographic section to an expected distribution of data pings.

Aspect 76 generally concerns the method of any previous aspect in which the geographic sections are divided into seven smaller geographic sections for each additional pass of the filter.

Aspect 77 generally concerns the method of any previous aspect including receiving geospatial data from a third-party data broker.

Aspect 78 generally concerns the method of any previous aspect in which the third-party data broker aggregates geospatial data for multiple user devices from multiple sources.

Aspect 79 generally concerns the method of any previous aspect including tracking changes in location of a user device across multiple points in time.

Aspect 80 generally concerns the method of any previous aspect including observing changes in location that are unnatural.

Aspect 81 generally concerns the method of any previous aspect including discarding data pings for those changes in location.

Aspect 82 generally concerns the method of any previous aspect including passing the data through the multi-pass filter at each point in time.

Aspect 83 generally concerns the method of any previous aspect in which the subcell represents the smaller area within the cell.

Aspect 84 generally concerns the method of any previous aspect including calculating a probability that data pings at a yet smaller area within the subcell are anomalous based on the data pings in the subcell.

Aspect 85 generally concerns the method of any previous aspect in which the smaller area within the cell includes a location centered on a particular latitude and longitude pairing.

Aspect 86 generally concerns the method of any previous aspect in which the expected distribution is a binomial distribution.

Aspect 87 generally concerns the method of any previous aspect in which the expected distribution is based on a uniform distribution.

Aspect 88 generally concerns the method of any previous aspect in which the density threshold condition includes a maximum ping count in a given area.

Aspect 89 generally concerns the method of any previous aspect in which the subcell is not fully contained within the cell.

Aspect 90 generally concerns the method of any previous aspect including accounting for anomalous data pings in subcells that are not fully contained within the cell.

Aspect 91 generally concerns the method of any previous aspect in which the maximum ping count is determined based on a probability threshold.

Aspect 92 generally concerns the method of any previous aspect in which the maximum ping count represents the highest amount of data pings in a subcell where the probability of the data pings being natural is above the probability threshold.

Aspect 93 generally concerns the method of any previous aspect in which the subcells have a uniform shape and size.

Aspect 94 generally concerns the method of any previous aspect in which the location has a resolution of a one-meter diameter circle.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
FIG. 1 is a block diagram of a system according to one embodiment.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Referring to FIG. 1, a system 100 is configured to filter anomalous data from geospatial and temporal data about users. Geospatial data generally includes recorded locations of users collected at various times. Temporal data can include timestamps when a location was recorded and/or other time-related data. Temporal data is oftentimes incorporated into the geospatial data. In many cases, geospatial data collected from a large number of users and/or accumulated by a third-party service includes anomalous data in some form. Such anomalous data generally describes approximate, inaccurate, and/or otherwise unnatural locations of users. By filtering the geospatial data, the system 100 generally ensures that only precise location observations are retained, and that approximated or altered location observations are removed from the data. The system 100 therefore provides reliable geospatial data about users. Such reliable data can be used by tourist attraction operators, event organizers, city planners, local municipalities, and/or other entities to gain valuable insight into population at different locations and times.

In one form, the system 100 generally includes a data refiner 105. The data refiner 105 is communicatively coupled to a network 110. The system 100 generally further includes a user device 115 and a third-party data broker 120 that are communicatively coupled to the network 110. The data refiner 105 is configured to read and analyze geospatial data. Particularly, the data refiner 105 is configured to review geospatial data and filter anomalous data from the geospatial data. By filtering the geospatial data, the data refiner 105 provides reliable data about users, including precise location observations. The data refiner 105 includes one or more computers. In one example, the data refiner 105 is a remote server and/or a network of computers. In another example, the data refiner 105 is a personal computer or other such device. The data refiner 105 includes an operating system 125. The operating system 125 typically stores and executes algorithms or software. For example, the operating system 125 includes one or more algorithms or programs for filtering data. Typically, the operating system 125 is configured to perform most or all of the data analysis and filtering in the data refiner 105. In one version, the operating system 125 is stored and executed on multiple computers, such as in a parallel computing cluster arrangement.

The network 110 supports communication between the data refiner 105, the user device 115, and/or the third-party data broker 120. The network 110 generally utilizes the Internet, a mobile network, and/or another type of network. In one example, the data refiner 105 is connected to the third-party data broker 120 over one network 110, and a separate network 110 connects the third-party data broker 120 to the user devices 115. For instance, the third-party data broker 120 can receive geolocation data from the user devices 115, aggregate the data from the multiple user devices 115 over a period of time, and send the aggregated geospatial data to the data refiner 105. In an alternate example, the user devices 115 are configured to send location data to the data refiner 105 directly via the network 110.

The user device 115 is generally a personal device owned and/or carried by a user. The user device 115 can for example include a mobile phone, personal computer, navigational device, and/or other types of devices. Typically, the user device 115 includes software, such as one or more applications, that record and/or report location data periodically. For instance, applications can record the location of the user device 115 when in use, when running in the background, at regular intervals, and/or in other ways. The user device 115 optionally sends such location data to a server, such as a server associated with a particular application on the user device 115. The user device 115 can utilize a variety of methods to determine the location of the user device 115. For instance, the user device 115 utilizes Global Positioning System (GPS), cell tower triangulation, Internet Protocol (IP) location tracking, and/or other techniques. The user device 115 records geolocation, temporal, and/or other types of data. In some cases, the geospatial data from the user device 115 includes multiple types of data.

The third-party data broker 120 is typically configured to receive geospatial data from multiple user devices 115 directly over the network 110 and/or from an intermediate data collector. For example, the third-party data broker 120 can receive geospatial data from one or more intermediate sources, such as internet providers, cell service providers, mobile device application servers, and/or other sources. The third-party data broker 120 generally includes one or more computers, such as a remote server and/or a database. The third-party data broker 120 provides geospatial data to the data refiner 105. In some cases, the third-party data broker 120 processes the data to some degree before sending to the data refiner 105. For instance, the third-party data broker 120 may inherently alter some of the geospatial data, such as through rounding and/or data tags, when aggregating data from multiple sources. Although not certain, these and similar actions by the third-party data broker 120 may cause data to be anomalous. Alternatively or additionally, certain types of user devices 115 may export anomalous data that is incorporated into larger sets of geospatial data by the third-party data broker 120.

Figure 2:
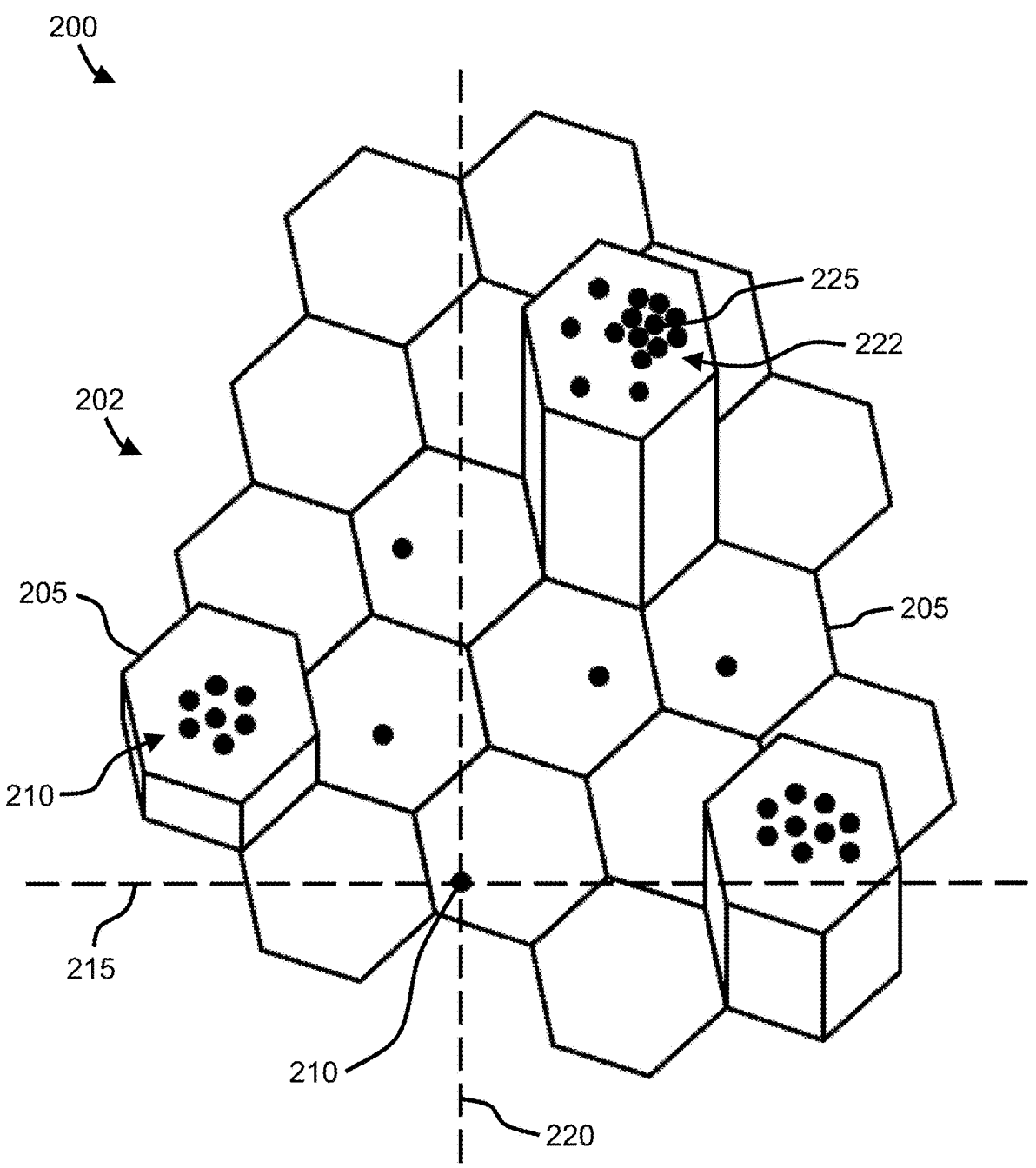
FIG. 2 is a diagram of a map representing data used by the FIG. 1 system.

Referring to FIG. 2, the geospatial data can be visualized as a map 200. In one version, the geospatial data is arranged into multiple geographic sections 202. Each geographic section 202 represents a distinct geographic area. The geospatial data can be organized into multiple tiers of geographic sections 202. In the illustrated example, the geospatial data is organized into cells 205. The cells 205 are the highest level of geographic sections 202. In other words, the cells 205 are the largest geographic sections 202 and are the first geographic division of the geospatial data. The geographic sections 202 can be shaped in a variety of ways. In the illustrated example, the cells 205 are hexagonal. In other examples, the cells 205 are square, triangular, and/or another shape. In yet another example, the cells 205 utilize existing geographic borders, such as county, city, zip code, and/or other boundaries.

As illustrated, the geospatial data includes data pings 210 that are dispersed across various cells 205 on the map 200. Each data ping 210 generally includes location data recorded by a user device 115 at a particular time. Such location data includes a latitude 215 and a longitude 220. The latitude 215 and the longitude 220 specify a relatively exact location of the user device 115. The resolution of the latitude 215, the longitude 220, and/or the time of recording can vary depending on the user device 115 and/or the third-party data broker 120. For example, various user devices 115 record location data at different times due to different privacy settings, different applications recording the data, and/or other factors. Further, various user devices 115 record the latitude 215 and the longitude 220 at different resolutions due to such factors. In one version, the data ping 210 represents a circular area with a one-meter diameter. In other words, the resolution of the data pings 210 is one-meter circle and all the data pings 210 in a given circle are considered to be at the same location. The data ping 210 typically includes some information about the user device 115, such as a unique device identification. Identifying information for the user device 115 is generally anonymized to protect privacy of the users. However, using some device-specific information from the user device 115 allows the system 100 to track changes in the locations of each user device 115 across multiple data pings 210 and/or to determine unique device counts in an area. The data pings 210 further include some temporal data about the user devices 115, such as a timestamp when the location was recorded, a length of time spent at the location, and/or other time-related data. Some temporal data is inherently included in the geospatial data, such as a timestamp and/or other data.

Before filtering, the geospatial data typically includes one or more anomalies 222. The anomalies 222 can appear in various forms. In the illustrated example, the geospatial data includes an anomaly 222 in the form of a hotspot 225. The hotspot 225 generally refers to an area that has an unusually high number of data pings 210. In some examples, the hotspot 225 refers to a particular cell 205 or other geographic section 202. In other examples, the hotspot 225 refers to a cluster of nearby cells 205 or other geographic sections 202 with an unusually high density of data pings 210. In yet other examples, the hotspot 225 refers to a particular location (e.g., a latitude 215 and longitude 220 pair) or a cluster of nearby locations with a combined number of data pings 210 that is unusually high. On the map 200, the hotspot 225 appears visually as a spikes that stick out from the rest of the data. A human can visually identify locations that are hotspots 225. In one version, the system 100 is configured to identify hotspots 225 in a similar way as a human eye. In one example, the system 100 identifies hotspots 225 within the data by comparing the distribution of the data pings 210 to typical distributions of people in a space. In another example, the system 100 utilizes artificial intelligence to identify hotspots 225 and/or other anomalies 222. Identifying the hotspots 225 in this way allows the system 100 to filter the hotspots 225 effectively regardless of the cause of the hotspots 225 in the data. The system 100 therefore is more robust than systems that attempt to remove the hotspots 225 based on particular causes, such as rounding of location data to the nearest latitude 215, longitude 220, and/or key location.

As should be appreciated, the geospatial data can include anomalies 222 in other forms. In one example, the anomaly 222 is in the form of a hot spike. Hot spikes generally include an unusually high number of data pings 210 that are located at notable locations and/or around latitude 215 and longitude 220 lines. Such notable locations are typically the exact location that is assigned to a generalized place, such as city centers and/or the center point of parks or other attractions as examples. In some forms, the hot spikes can appear as a series of latticed spikes emanating from one or more latitude 215 and longitude 220 lines. In another example, the anomaly 222 appears as a circle encompassing an area with increased density of data pings 210 compared to the unencompassed area. In yet another example, the anomalies 222 appear as streaks of many data pings 210 that extend along the latitude 215 lines and/or the longitude 220 lines. Because the system 100 is configured to filter the geospatial data based on the distribution of the data pings 210, the system 100 is able to effectively remove these and other types of anomalies 222 using a consistent technique.

Figure 3:
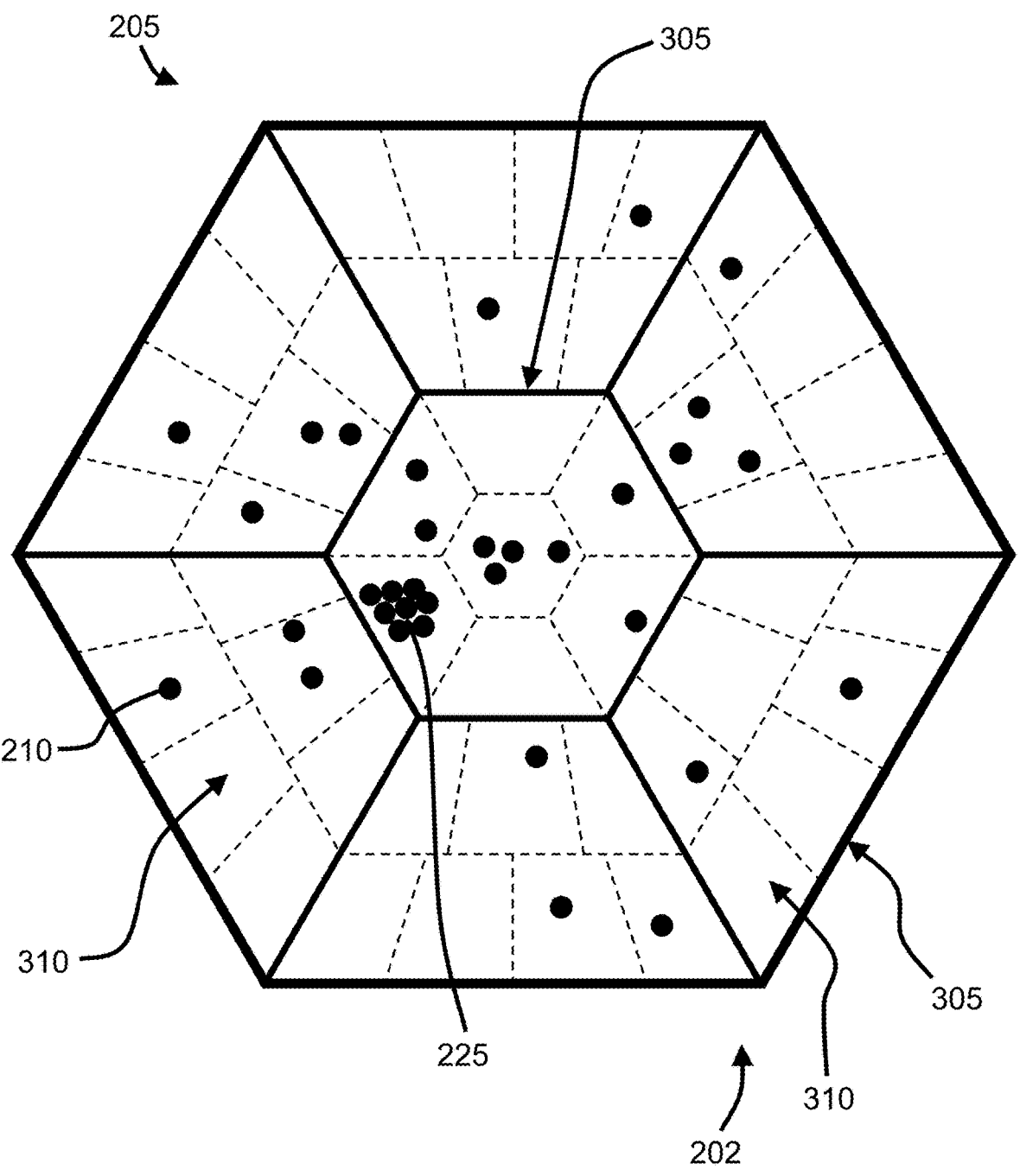
FIG. 3 is a diagram of a cell representing a portion of the data from the FIG. 2 map.

Referring to FIG. 3, the system 100 optionally arranges the geospatial data into multiple tiers of geographic sections 202. In the illustrated example, each cell 205 is further arranged into multiple first subcell divisions 305 that represent smaller geographic area within each cell 205. Further, the first subcell divisions 305 are divided into multiple second subcell divisions 310 that represent smaller geographic areas within each first subcell division 305. Optionally, the geospatial data is divided into further sets of geographic sections 202 within the second subcell divisions 310. Organizing the geospatial data into multiple tiers of geographic sections 202 allows the system 100 to analyze the geospatial data using a multi-pass approach. The multi-pass approach generally checks for anomalies 222 within the context of the geographic sections 202 at a different tier in each pass. For example, using the multi-pass filtering approach, the data refiner 105 checks for anomalies 222 in each cell 205 on a first pass, then in each first subcell division 305 on a second pass, and then in each second subcell division 310 on a third pass. Filtering the data in this way allows the system 100 to identify anomalies 222 on a smaller scale that may not be discernable on an initial filtering of the geospatial data. For instance, the distribution of data pings 210 in a given cell 205 may appear natural, but the distribution of the data pings 210 in a given first subcell division 305 within the cell 205 may reveal one or more anomalies 222. As another example, the data pings 210 in a given cell 205 may have a low probability of being anomalous when evaluated at the level of the cell 205. But at the level of the first subcell division 305, the data pings 210 at one or more locations may have a high probability of being anomalous. Using the multi-pass filtering approach ensures that the geospatial data is thoroughly filtered. Particularly, the multi-pass filter ensures that the data pings 210 are reliable and represent precise locations in small geographic areas.

In one version, the data refiner 105 organizes the geospatial data into multiple geographic sections 202. In another version, the third-party data broker 120 sends the geospatial data pre-arranged into one or more tiers of geographic sections 202. The number of tiers of the geographic sections 202 generally corresponds to the number of iterations of the multi-pass filter. In one example, the number of iterations is determined before the system 100 filters the data. For instance, the system 100 can arrange the geospatial data into a desired number of tiers of geographic sections 202 before filtering. In the FIG. 2 example, the multi-pass filter uses three passes and organizes the geospatial data into three tiers of geographic sections 202. In another example, the system 100 determines the number of tiers of geographic sections 202 dynamically during filtering. For instance, the system 100 can divide the geospatial data into a certain number of tiers of geographic sections 202 based on the geospatial data being evaluated. The size and/or number of the geographic sections 202 is customizable. In the illustrated version, the cell 205 is divided into seven first subcell divisions 305, and the first subcell divisions 305 are each divided into seven second subcell divisions 310. In one example, each first subcell division 305 spans the same amount of geographic area, and each second subcell division 310 spans the same amount of geographic area. As should be appreciated, the cells 205, the first subcell divisions 305, and/or the second subcell divisions 310 can be divided differently to adjust the size, shape, and/or number of geographic sections 202.

Figure 4:
FIG. 4 is a block diagram of a data refiner from the FIG. 1 system.
Figure 4:
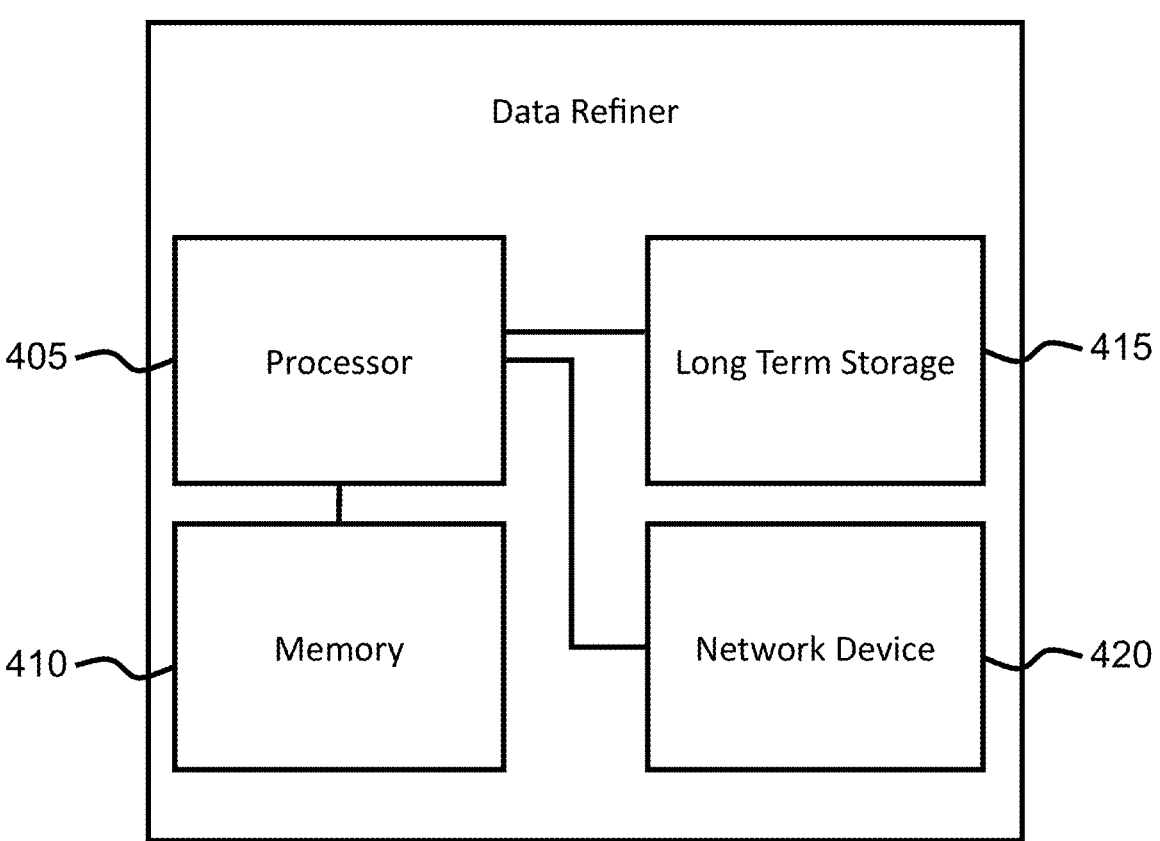

FIG. 4 illustrates one embodiment of the data refiner 105. The data refiner 105 generally includes at least one processor 405, memory 410, long-term storage device 415, and networking device 420. The processor 405 is generally connected to and configured to communicate with the memory 410, the long-term storage device 415, and the networking device 420. In one version, the data refiner 105 includes multiple processors 405, memories 410, long-term storage devices 415, and/or networking devices 420 that are split across multiple devices, such as across multiple computers in a computing cluster and/or network of computers.

The processor 405 is configured to perform calculations and/or other computational tasks. For example, the processor 405 performs algorithms for filtering the geospatial data, for organizing the geospatial data into geographic sections 202, and/or for other tasks. The processor 405 generally runs the operating system 125 and/or performs tasks for the operating system 125. The memory 410 is configured to store data, algorithms, and/or other information. For example, the memory 410 stores one or more filtering algorithms. In another example, the memory 410 stores geospatial data before, during, and/or after the processor 405 filters the data. The long-term storage device 415 similarly is configured to store data, algorithms, and/or other information. The long-term storage device 415 typically has a larger capacity than the memory 410, while the memory 410 is typically configured to communicate data more quickly to the processor 405 compared to the long-term storage device 415. In one example, the long-term storage device 415 stores large amounts of data, such as geospatial data recorded by the user devices 115 across multiple days or months. The memory 410 then stores a subset of the geospatial data being processed by the processor 405, such as the data for a single geographic section 202 and/or the data for a single point in time. Further, the memory 410 and/or the long-term storage device 415 store the operating system 125.

The networking device 420 is configured to provide an interface between the data refiner 105 and the network 110 and/or another network. The networking device 420 generally allows the data refiner 105 to send and/or receive data, commands, and/or other information across the network 110. For instance, the data refiner 105 receives data from the user devices 115 and/or the third-party data broker 120 using the networking device 420. The networking device 420 supports wired and/or wireless connections. In one version, the data refiner 105 further includes one or more input/output (I/O) devices. The I/O devices generally allow a user to adjust the performance of the data refiner 105, such as by altering one or more parameters of a filtering equation, changing the type of filter being used, and/or adjusting the organization of geospatial data as examples. In another example, a user can adjust the data refiner 105 in such ways by sending commands to the data refiner 105 via the network 110.

Referring to FIGS. 5, 6, 7, 8, 9, and 11, the system 100 is configured to perform a method or technique for filtering anomalies 222 from the data. One or more parts of the system 100 perform various parts of the method. For example, the data refiner 105 is configured to perform one or more parts of the method. Further, different parts of the data refiner 105 may perform one or more parts of the method. For instance, the processor 405, memory 410, and/or networking device 420 in the data refiner 105 perform one or more parts of the method. Further, the operating system 125 generally stores and/or executes one or more parts of the method. For instance, the operating system 125 includes one or more filters in the form of an algorithm or other software.

Figure 5:
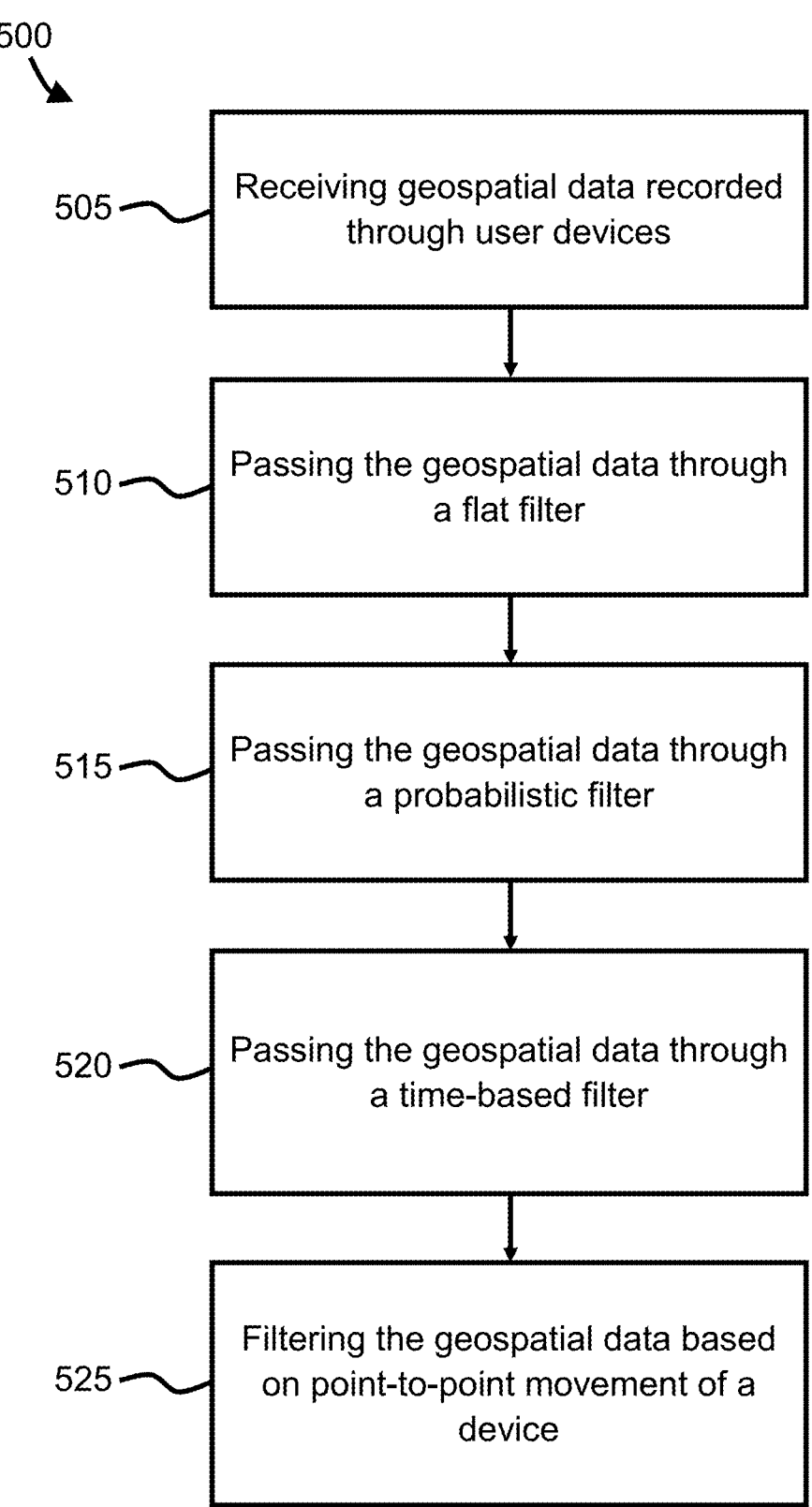
FIG. 5 is a flowchart of a technique used by the FIG. 1 system for filtering geospatial data.

FIG. 5 is a flowchart 500 that demonstrates a method for filtering geospatial data. The geospatial data typically includes data recorded from multiple user devices 115 and/or other sources. Such data almost always includes anomalies 222 in some form. While all causes of such anomalies 222 are not fully understood, some causes may be accumulating data from a variety of sources and/or the third-party data broker 120 modifying data in various ways. The technique of the flowchart 500 provides a generalized solution that supports filtering regardless of the cause of any anomalies 222 in the data. Using a generalized solution ensures that the data refiner 105 is configured to filter geospatial data despite unknown or new causes of anomalies 222 in the data. In one example, the technique of the flowchart 500 allows the data refiner 105 to filter approximate location observations from a user device 115 while retaining precise location observations from the user device 115. Such approximate location observations are generally observed as one or more anomalies 222, such as a hotspot 225 for example. The data refiner 105 is configured to use any combination of the filtering styles at stage 510, at stage 515, at stage 520, and/or at stage 525 to filter the anomalies 222 from the geospatial data.

At stage 505, the data refiner 105 receives geospatial data recorded from various user devices 115. The user devices 115 record data through GPS, cell tower pinging, and/or in other ways. The user devices 115 then send the data to the data refiner 105, to the third-party data broker 120, and/or to another server, such as for a particular application that checks the location of the user device 115. The data refiner 105 then receives such data directly from the user devices 115 over the network 110 and/or indirectly from the third-party data broker 120 and/or another server. In one example, the third-party data broker 120 sends geospatial data from the user devices 115 that has been collected over a length of time, such as a day, week, month, or another period. As noted, geospatial data collected in this way can include a variety of anomalies 222. Although all causes of such anomalies 222 are not fully understood, it is theorized that such anomalies 222 can be caused by rounding the data, the way location of the user device 115 is determined, the type of user device 115 used, the type of software or application on the user device 115, and/or processing the data by the third-party data broker 120 as some examples.

The data refiner 105 is configured to filter the geospatial data in one or more ways to remove anomalies 222 from the data. At stage 510, the data refiner 105 applies a flat filter to the geospatial data. The flat filter removes the data pings 210 from the data for locations that have a ping count above a threshold. Alternatively or additionally, the flat filter removes the data pings 210 from the data for cells 205, first subcell divisions 305, second subcell divisions 310, and/or other geographic sections 202 that have a ping count above the threshold. For example, the flat filter removes the data pings 210 when the count is above 50, 100, 500, 1000, or another number. In one example, the flat filter is conservative, such as with a threshold of 100 pings or higher, to remove only the most apparent hotspots 225. In another example, the flat filter is more aggressive and removes the data pings 210 at hotspots 225 with ping counts greater than 3, 4, 5, or 10 pings as examples.

At stage 515, the data refiner 105 passes the geospatial data through a probabilistic filter. The probabilistic filter generally removes data pings 210 from the geospatial data based on a probability that those data pings 210 are anomalous. For example, the probabilistic filter is configured to remove the data pings 210 at locations that have a high probability of being a hotspot 225. The probabilistic filter typically determines a probability based on a natural distribution and/or density of people in a geographic area. The probability generally represents the likelihood that the data pings 210 being evaluated are approximate, unreliable, and/or unnatural. Filtering based on probability allows the data refiner 105 to remove anomalous data caused by a variety of reasons. In one example, the data refiner 105 passes the geospatial data through the probabilistic filter multiple times as an iterative process.

At stage 520, the data refiner 105 passes the geospatial data through a time-based filter. Using the time-based filter, the data refiner 105 removes data pings 210 from the dataset that are observed across a certain period of time. The time-based filter utilizes the flat filter, the probabilistic filter, and/or another type of filter at multiple points in time within the geospatial data. The time-based filter generally provides an added layer of confidence to the other filters. Generally, the time-based filter flags the data pings 210 that might be anomalous at various points in time. Because the anomalies 222 typically persist over longer periods of time, the data refiner 105 generally verifies whether certain data pings 210 are anomalous by considering the extent of time the data pings 210 were flagged. Therefore, in some cases, the time-based filter provides more certainty compared to filtering at a single point in time.

At stage 525, the data refiner 105 utilizes a filter that considers the movement of the user devices 115 over time. The data refiner 105 determines whether the movement of the user devices 115 is unrealistic and/or unnatural. For example, geospatial data from a particular user device 115 may show the user device 115 travel long distances in an instant. In another example, geospatial data from a particular user device 115 may continuously approximate the location of the user device 115 to certain latitudes 215, longitudes 220, and/or tagged locations. Filtering based on point-to-point movement of the user devices 115 allows the data refiner 105 to remove anomalous data pings 210 that might only be visible across different points in time. Compared to using one or more filters at a single point in time, the data refiner 105 is generally more robust for filtering different types of anomalies 222 by using the point-to-point movement filter. For instance, anomalous point-to-point movement data might appear natural to some filters, and the point-to-point movement filter provides a way to remove such anomalous data that other filters might miss.

Figure 6:
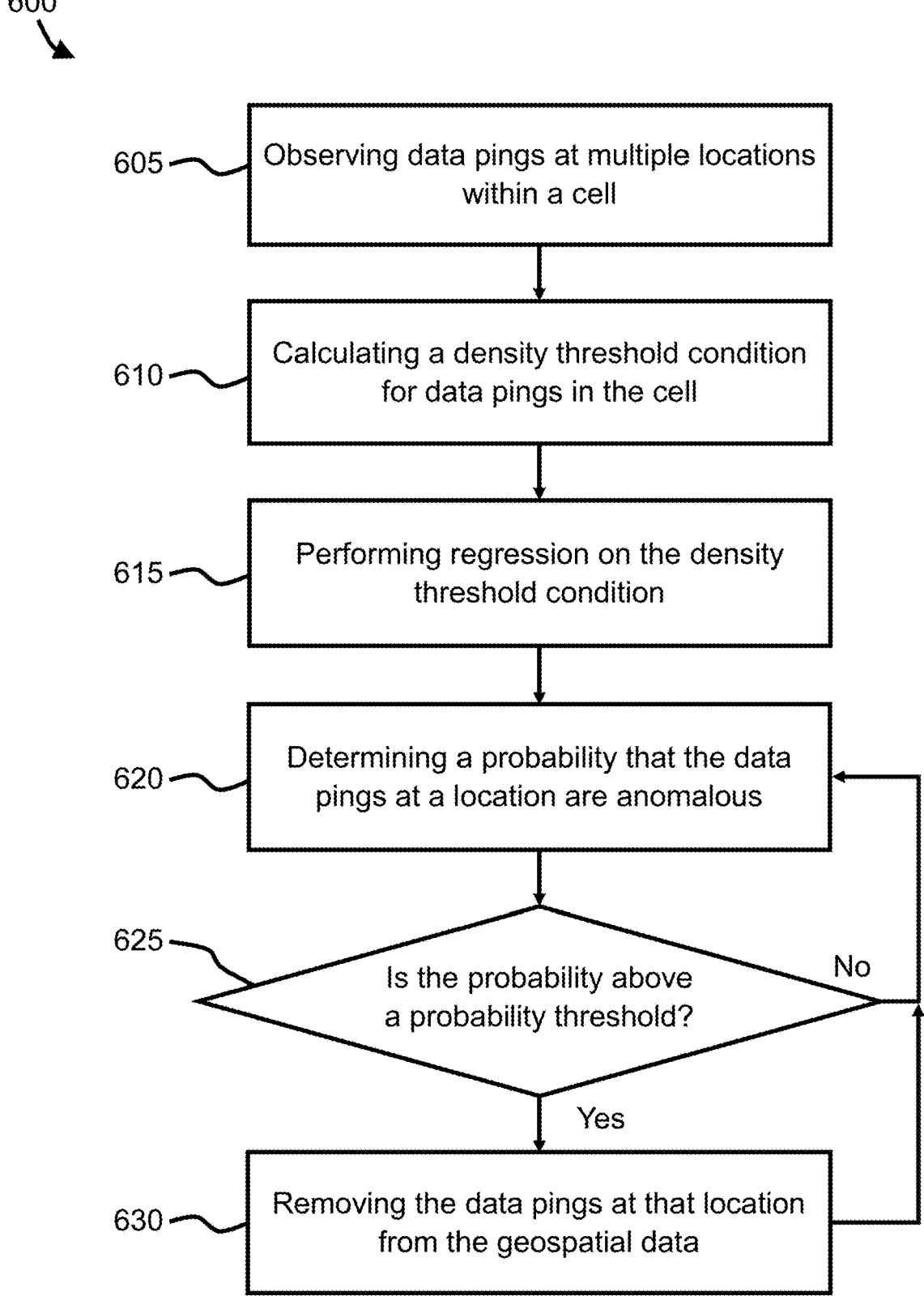
FIG. 6 is a flowchart of a technique used by the FIG. 1 system for removing anomalies from geospatial data based on probability.

FIG. 6 illustrates a flowchart 600 for passing the data through a probabilistic filter. In one example, the data refiner 105 performs the technique from the flowchart 600 when performing stage 515 of the flowchart 500 in FIG. 5. At stage 605, the data refiner 105 observes the data pings 210 within a given geographic section 202, such as within one of the cells 205. In one example, the geospatial data is already organized based on geography, such as for each geographic section 202 and/or each location. In another example, the data refiner 105 organizes the geospatial data into geographic sections 202 and/or identifies the geospatial data for a particular geographic section 202 at stage 605. As should be appreciated, the data refiner 105 is configured to evaluate the geospatial data on the scale of the cell 205, the first subcell division 305, the second subcell division 310, and/or another level of geographic division.

At stage 610, the data refiner 105 calculates a density threshold condition for the geographic section 202. The density threshold condition represents a realistic distribution of the data pings 210 within the geographic section 202. In other words, the density threshold condition is a limit on the spatial density of the data pings 210 within the geographic section 202. In one example, the density threshold condition describes a realistic limit on the number of data pings 210 observed in each cell 205, first subcell division 305, location, and/or cluster of locations within the given geographic section 202. For instance, the density threshold condition is a maximum ping count allowed in each first subcell division 305 within a given cell 205, each second subcell division 310 in a given first subcell division 305, and/or in another smaller area within the geographic section 202. The data refiner 105 generally utilizes equations that describe the spreading of people or things in a space. In one version, the data refiner 105 determines the density threshold condition based on thermodynamic principles that describe the movement of particles and/or the dispersion of heat in a space. In another version, the data refiner 105 determines the density threshold condition using mean field game theory principles that describe the movements of individuals within a large group.

At stage 615, the data refiner 105 performs regression on the density threshold condition. Because the data pings 210 are discrete data points, performing regression allows the data refiner 105 to characterize the density threshold condition with respect to certain variables. The density threshold condition generally changes based on the number of data pings 210 within the geographic section 202 (e.g., the cell 205), the number of data pings 210 within a smaller area in the geographic section 202 (e.g., the first subcell division 305 in a given cell 205), the number of data pings 210 at a particular location (e.g., a particular latitude 215 and longitude 220 combination), and/or other variables. Further, the data refiner 105 utilizes parameters that adjust the aggressiveness of the density threshold condition. In one example, the data refiner 105 determines appropriate parameters based on the geospatial data. In another example, a user can manually set such parameters before the data refiner 105 evaluates the geospatial data. In yet another example, the parameters vary depending on the particular geographic section 202, such as using more aggressive parameters in a less busy cell 205 and using less aggressive parameters in a busier cell 205.

At stage 620, the data refiner 105 determines a probability that the data pings 210 at a location are anomalous. For the purpose of explanation, the probability is described based on each location. As should be appreciated, the data refiner 105 is configured to determine probabilities based on other geographic areas, such as in each first subcell division 305, in each second subcell division 310, and/or in other smaller areas in a given cell 205. The probability is typically based on the density threshold condition. The data refiner 105 typically determines a probability for the data pings 210 at each specific location and/or each cluster of nearby data pings 210. For example, the data refiner 105 calculates a probability at each latitude 215 and longitude 220 intersection and/or for a proximity surrounding each intersection. The probability represents the chance that the data pings 210 do not reflect the actual location of the user devices 115. In other words, the probability generally suggests whether the data pings 210 at a location are caused by an artificial hotspot 225 or another type of anomaly 222.

At stage 625, the data refiner 105 then compares the calculated probability to a probability threshold. In one version, the threshold is 95%. In this version, the data refiner 105 therefore checks whether the probability that the data pings 210 are anomalous is above 95%. In other words, the data refiner 105 checks whether there is less than a 5% chance of the data pings 210 being natural and reflecting the actual location of the data refiners 105. Such a probability threshold provides room to avoid flagging false positives, such as naturally occurring hotspots. For instance, the 95% probability threshold reserves a 5% probability rate to account for false positives. As should be appreciated, the threshold can be set to another value. For example, a higher probability threshold generally requires that more of the geospatial data is natural and not anomalous. Alternatively, rather than raising the probability threshold, using more aggressive regression parameters at stage 615 generally eliminates more anomalous data. Adjusting regression parameters rather than the probability threshold can allow the data refiner 105 to identify more anomalies 222, such as hotspots 225 hidden in a cluster of data pings 210, while still maintaining the same false positive rate.

If the probability is below the threshold (i.e., low chance that the data is anomalous), the data refiner 105 keeps the evaluated data pings 210 because those data pings 210 likely include reliable location data. The data refiner 105 then returns to stage 620 to evaluate the probability for the data pings 210 at another location in the geographic section 202. Conversely, if the probability is above the threshold, the data refiner 105 continues to stage 630. At stage 630, the data refiner 105 removes the evaluated data pings 210 from the geospatial dataset. By removing such data pings 210, the data refiner 105 ensures that the geospatial data is completely or nearly completely free from unreliable and inaccurate location data of the user devices 115. After the data refiner 105 has evaluated the data pings 210 across each location, the geospatial data is highly reliable and generally reflects the actual location of the user devices 115.

Figure 7:
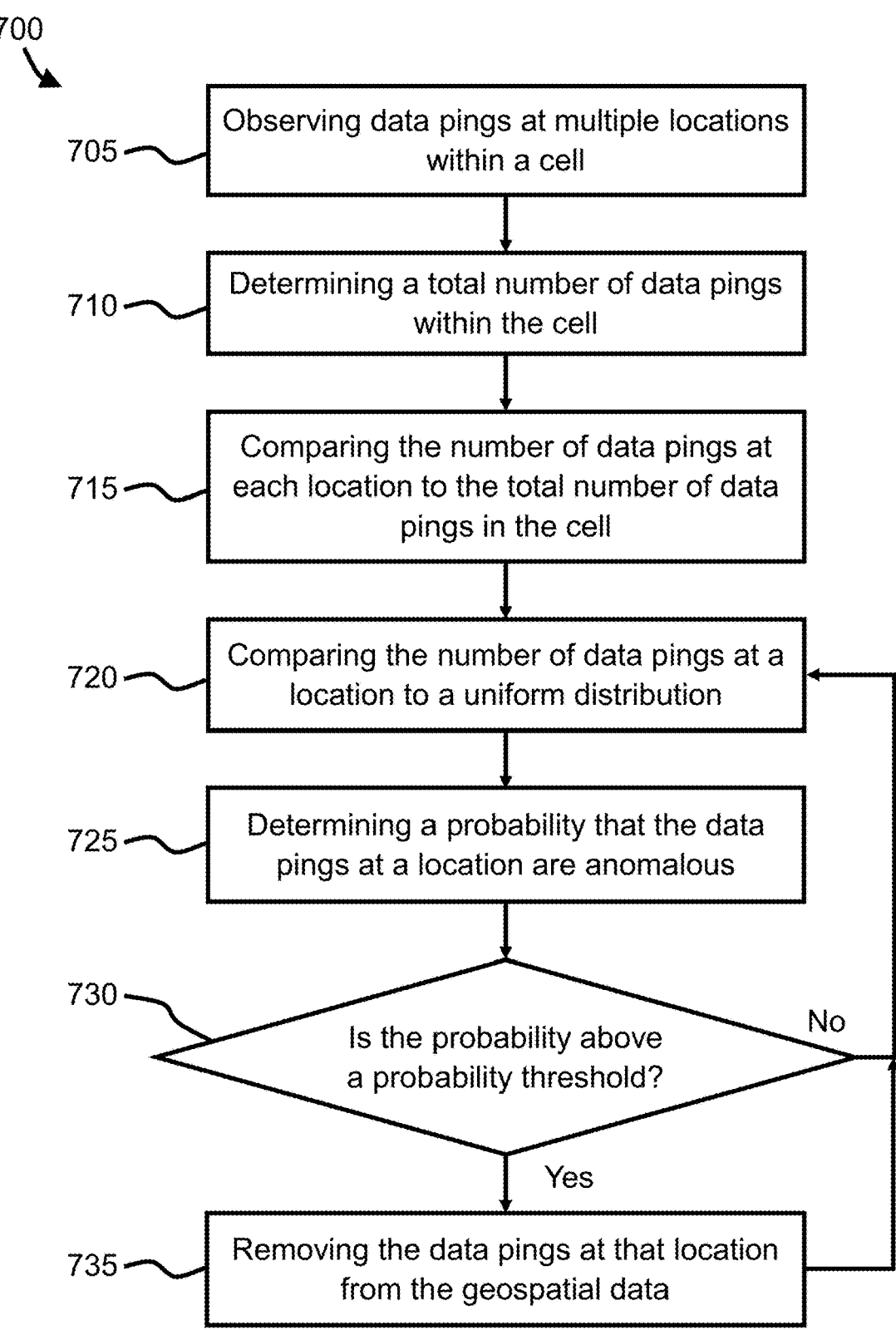
FIG. 7 is a flowchart of another technique used by the FIG. 1 system for removing anomalies from geospatial data based on probability.

Referring to FIG. 7, a flowchart 700 represents another technique for passing the geospatial data through a filter. In one example, the data refiner 105 performs the technique shown by the flowchart 700 when performing stage 515 of the flowchart 500 in FIG. 5. In one version, the data refiner 105 utilizes a combination of the techniques shown in the flowchart 600 and the flowchart 700 when performing stage 515 of the flowchart 500 in FIG. 5. At stage 705, the data refiner 105 observes the data pings 210 within a given geographic section 202, such as within one of the cells 205. Generally, the data refiner 105 performs the actions at stage 705 in the same way as at stage 605 in the flowchart 600 in FIG. 6.

At stage 710, the data refiner 105 determines the number of data pings 210 within the geographic section 202. In one example, the data refiner 105 identifies each data ping 210 in the given geographic section 202. In another example, the number of data pings 210 in the geographic section 202 is already calculated, such as during a pre-processing step and/or when the geospatial data is organized into the geographic sections 202. The geospatial data is optionally pre-processed by the data refiner 105, the third-party data broker 120, and/or another device.

At stage 715, the data refiner 105 compares the number of data pings 210 at each location to the total number of data pings 210 in the geographic section 202. The data refiner 105 determines the number of data pings 210 at a location based on a particular latitude 215 and longitude 220 intersection and/or based on a proximity surrounding each intersection. In one version, the data refiner 105 compares the number of data pings 210 in the geographic section 202 to the number of data pings 210 in each subdivision of that geographic section 202. For example, the data refiner 105 compares the number of data pings 210 in each first subcell division 305 in a given cell 205 to the total number of data pings 210 in that cell 205.

At stage 720, the data refiner 105 then compares the distribution of the data pings 210 within the geographic section 202 to a uniform distribution. The data refiner 105 optionally utilizes other types of distributions at a target distribution. The target distribution generally represents the expected distribution of individuals in a given space. In one example, the data refiner 105 determines a target distribution utilizing various techniques, such as techniques from mean field game theory, thermodynamics, and/or other fields. Comparing the observed distribution of the data pings 210 to the target distribution generally allows the data refiner 105 to identify an unnatural distribution of data ping 210 regardless of the cause of any anomalies 222 in the data. In one version, the data refiner 105 performs the actions from stage 710, stage 715, and/or stage 720 when performing the technique of the flowchart 600 in FIG. 6. stage 610 and/or stage 615 incorporate the actions from stage 710, stage 715, and/or stage 720 in one example. As an example, the data refiner 105 calculates the density threshold condition based on the ratio between the number of data pings 210 at a location and the total number of data pings 210 in the geographic section 202. As another example, the data refiner 105 calculates the density threshold condition based on the comparison of the observed distribution of data pings 210 to a uniform distribution.

At stage 725, the data refiner 105 calculates a probability that the data pings 210 at a location are anomalous. The probability is determined based on the comparison of the data pings 210 within the geographic section 202 to the uniform distribution. The probability therefore generally reflects the chance that the data pings 210 are unnatural with respect to a uniform distribution.

At stage 730, the data refiner 105 then compares the calculated probability to a probability threshold. In one version, the data refiner 105 performs the probability check in the same way as at stage 625 in the flowchart 600. In another version, the data refiner 105 uses a different probability threshold, such as 75%, 80%, 90%, or another percentage. If the probability falls below the threshold, the data refiner 105 keeps the evaluated data pings 210 within the geospatial dataset. The data refiner 105 then returns to stage 720 or stage 725 to evaluate probability for the data pings 210 at another location in the geographic section 202. Conversely, if the probability is above the threshold, the data refiner 105 continues to stage 735. At stage 735, the data refiner 105 removes the evaluated data pings 210 from the geospatial dataset. As should be appreciated, the data refiner 105 can perform the same actions at stage 725, stage 730, and/or stage 735 in the flowchart 700 as at stage 620, stage 625, and/or stage 630 in the flowchart 600.

Figure 8:
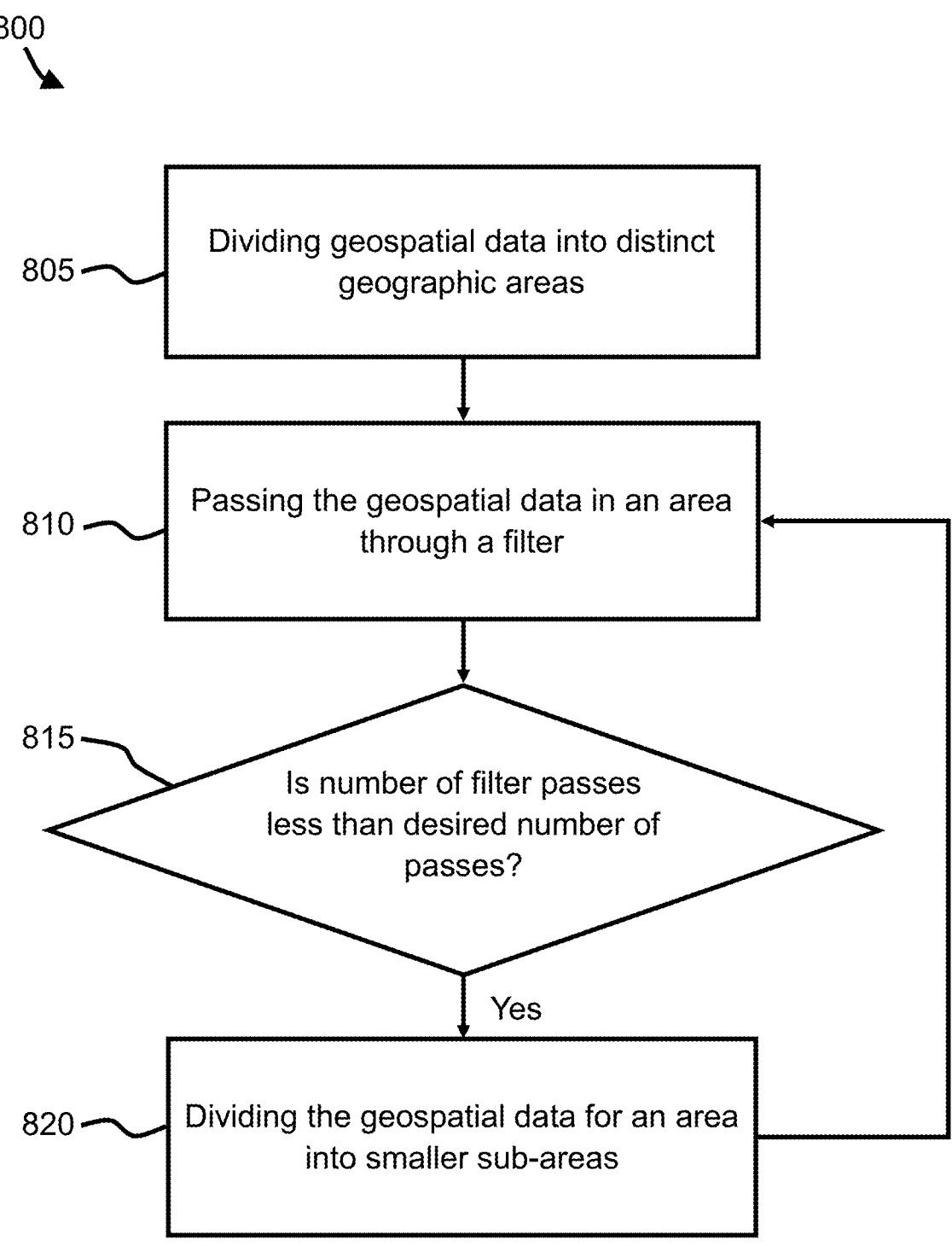
FIG. 8 is a flowchart of a technique used by the FIG. 1 system for filtering geospatial data using a multi-pass filter.

FIG. 8 is a flowchart 800 describing a technique for passing the geospatial data through a multi-pass filter. In one example, the data refiner 105 utilizes the technique shown in the flowchart 800 when performing stage 515 in the flowchart 500 in FIG. 5. At stage 805, the data refiner 105 divides the geospatial data into geographic sections 202. The data refiner 105 optionally organizes all the geospatial data in advance and/or the geospatial data is already organized when the data refiner 105 receives the data. In one example, the data refiner 105 organizes the geospatial data into geographic sections 202 at each iteration. For instance, the data refiner 105 organizes the data into cells 205 on the first pass, into first subcell divisions 305 on the second pass, and so on.

At stage 810, the data refiner 105 passes the geospatial data for the given geographic section 202 through a filter. In one version, the filter utilizes the techniques shown in the flowchart 600 in FIG. 6 and/or in the flowchart 700 in FIG. 7. In another version, the filter is a flat filter, a different type of probabilistic filter, and/or another type of filter. The filtering step generally removes anomalies 222 that are observed at the level of the geographic section 202. For example, the filter generally removes data pings 210 that appear to be unnatural based on the density and/or distribution of the data pings 210 in the given geographic section 202. Each pass of the filter typically evaluates the data pings 210 on the scale of a smaller geographic section 202, such as the cell 205 on a first pass and then the first subcell division 305 on a second pass. The data refiner 105 passes the data pings 210 in each geographic section 202 on that level (e.g., each first subcell division 305 in a given cell 205 and/or in the entire dataset, each second subcell division 310 in a given first subcell division 305 and/or in the entire dataset) through the filter. In one version, the filtering at stage 810 is parallelized across multiple computers and/or processors. Because the data pings 210 in multiple separate geographic sections 202 are evaluated at stage 810, the data refiner 105 is able to perform the filtering calculations simultaneously across multiple processors, processor cores, computing clusters, and/or other devices. Parallelization generally allows the data refiner 105 to filter the geospatial data more quickly on each pass compared to non-parallelized computing arrangements.

After filtering through the data, the data refiner 105 checks whether the number of desired filter passes has been met at stage 815. In one example, the desired number of filter passes is tuned to a certain number of passes, such as 2, 3, 4, or another number of passes. In another example, the data refiner 105 dynamically determines the total number of passes. For instance, the data refiner 105 is configured to determine a desired number of passes based on the geospatial data as a whole, based on the specific geographic section 202 being evaluated, and/or based on other factors. If the data refiner 105 has passed the geospatial data through the filter the desired number of times, then the multi-pass filtering is complete. If the desired number of passes is greater than the current number of completed passes, then the data refiner 105 continues to stage 820.

At stage 820, the data refiner 105 divides the geospatial data into smaller geographic sections 202 and/or prepares the geospatial data for the next division of geographic sections 202. Again, the data refiner 105 optionally organizes the geospatial data into multiple divisions of geographic sections 202 before filtering and/or the geospatial data is optionally pre-organized into the geographic sections 202 when the data refiner 105 receives the data. The data refiner 105 then returns to stage 810 to perform another filtering pass through the geospatial data. The subsequent pass filters through the geospatial data in the context of the smaller geographic section 202. As should be appreciated, the data refiner 105 is configured to iterate through the geospatial data any number of times and/or using any type of filter on each pass.

For the example arrangement illustrated in FIGS. 2 and 3, the data refiner 105 first applies the probabilistic filter to the data pings 210 in each cell 205. After checking the data pings 210 at the level of the cell 205, the data refiner 105 then applies the filter to the data pings 210 in each first subcell division 305. After checking the data pings 210 at the level of the first subcell division 305, the data refiner 105 then applies the filter to the data pings 210 in each second subcell division 310. Using this iterative approach typically allows the data refiner 105 to identify anomalies 222 that may be hidden at higher levels. For example, passing the geospatial data through the filter based on each cell 205 may only reveal large and obvious anomalies 222. But passing the geospatial data through the filter based on each first subcell division 305, second subcell division 310, and/or smaller geographic divisions can reveal other anomalies 222 that are not visible on the first pass. The multi-pass filtering approach is therefore more thorough than other types of filtering. Further, the multi-pass filtering ensures that the geospatial data is reliable on small geographic scales. For example, using multi-pass filtering generally ensures that geospatial data for user devices 115 within a small town, at a particular event venue, and/or another small-scale geographic area is free from anomalies 222.

Figure 9:
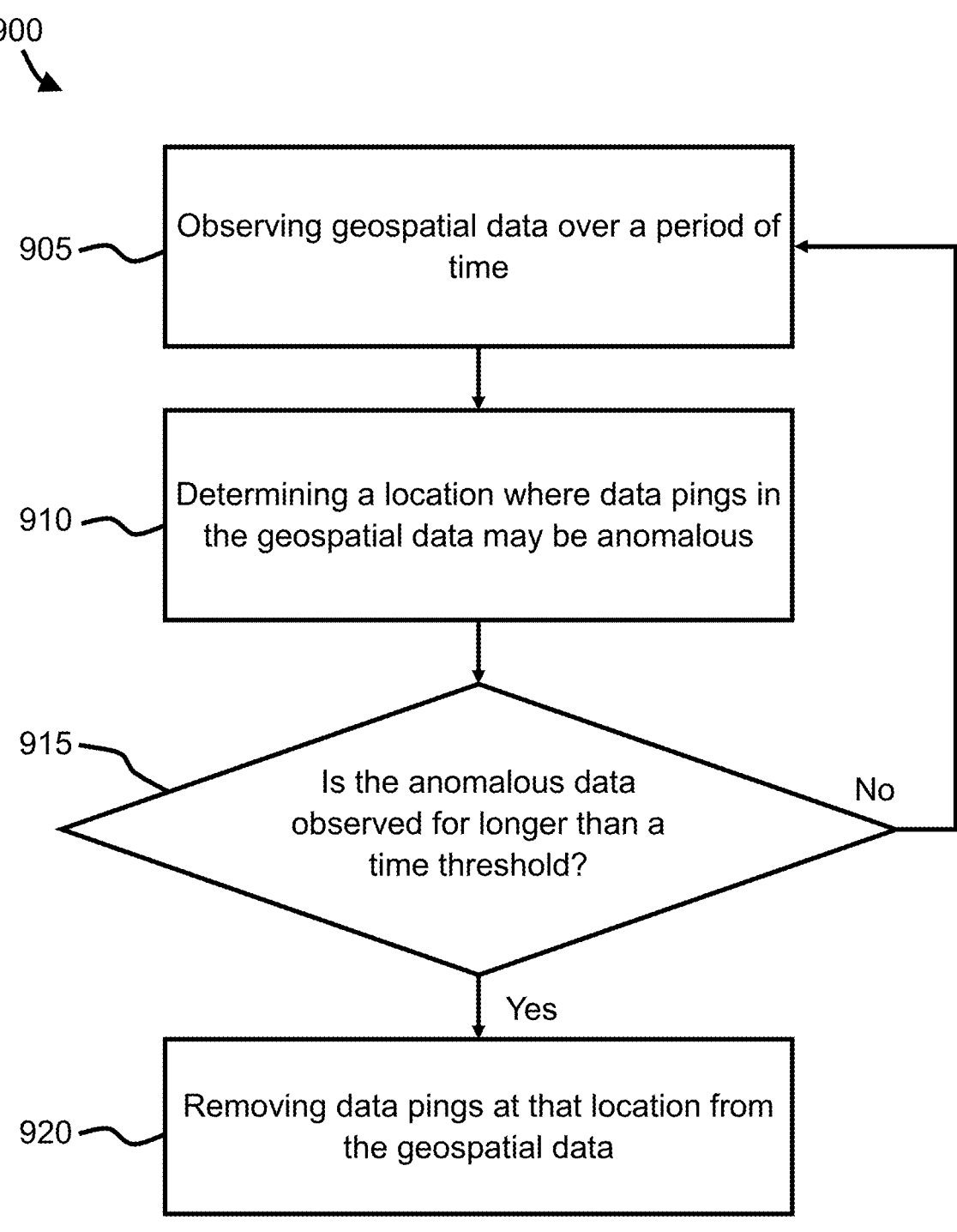
FIG. 9 is a flowchart of a technique used by the FIG. 1 system for removing anomalies from geospatial data based on time.

FIG. 9 is a flowchart 900 demonstrating a technique for filtering the geospatial data based on time. The technique of the flowchart 900 generally removes anomalies 222 that persist over long periods of time. At stage 905, the data refiner 105 observes the geospatial data over a certain period of time. In one example, the data refiner 105 is configured to store geospatial data that is received in multiple instances across a period of time, such as within the networking device 420. In such an example, the data refiner 105 accumulates geospatial data over days, weeks, months, and/or another length of time. In an alternative example, the data refiner 105 receives a set of geospatial data that spans across the desired period of time.

At stage 910, the data refiner 105 then identifies locations where the data might be anomalous. In one example, the data refiner 105 passes the data through a filter, such as a flat filter and/or a probabilistic filter. The data refiner 105 generally utilizes one or more of the techniques demonstrated in the flowchart 600, the flowchart 700, and/or the flowchart 800. However, rather than removing data pings 210 that have a high probability to be anomalous, the data refiner 105 flags those data pings 210 and/or identifies those data pings 210 in another way. The data refiner 105 generally filters the geospatial data in this way for each distinct time in the dataset and/or at a sampling of points in time.

After identifying potential anomalies 222 within the geospatial data across a span of time, the data refiner 105 continues to stage 915. At stage 915, the data refiner 105 determines how long potential anomalies 222 are observed within the given period of time. For example, the data refiner 105 evaluates the total length of time that certain data pings 210 were flagged at stage 910. The data refiner 105 compares the observed time for potential anomalies 222 to a time threshold. The observed time is the total length of time the anomaly 222 is observed, the longest continuous stretch of time the anomaly 222 is observed, and/or another measure of time. The time threshold is set to an hour, a day, a month, and/or another period of time. The time threshold is manually set before filtering, determined dynamically during filtering by the data refiner 105, and/or determined in another way. If the data refiner 105 observes the anomalous data longer than the time threshold, the data refiner 105 continues to stage 920. At stage 920, the data refiner 105 removes the data pings 210 that were identified as anomalous. If the anomalous data does not persist beyond the time threshold, then the data refiner 105 completes filtering. The data refiner 105 optionally returns to stage 905 to begin filtering the geospatial data for a new period time. Although the causes of anomalies 222 are not fully understood, the anomalies 222 generally tend to persist over longer periods of time. Compared to other filtering methods, filtering based on observation time allows the data refiner 105 to be more robust and more accurately distinguish between natural and anomalous data.

Figure 10:
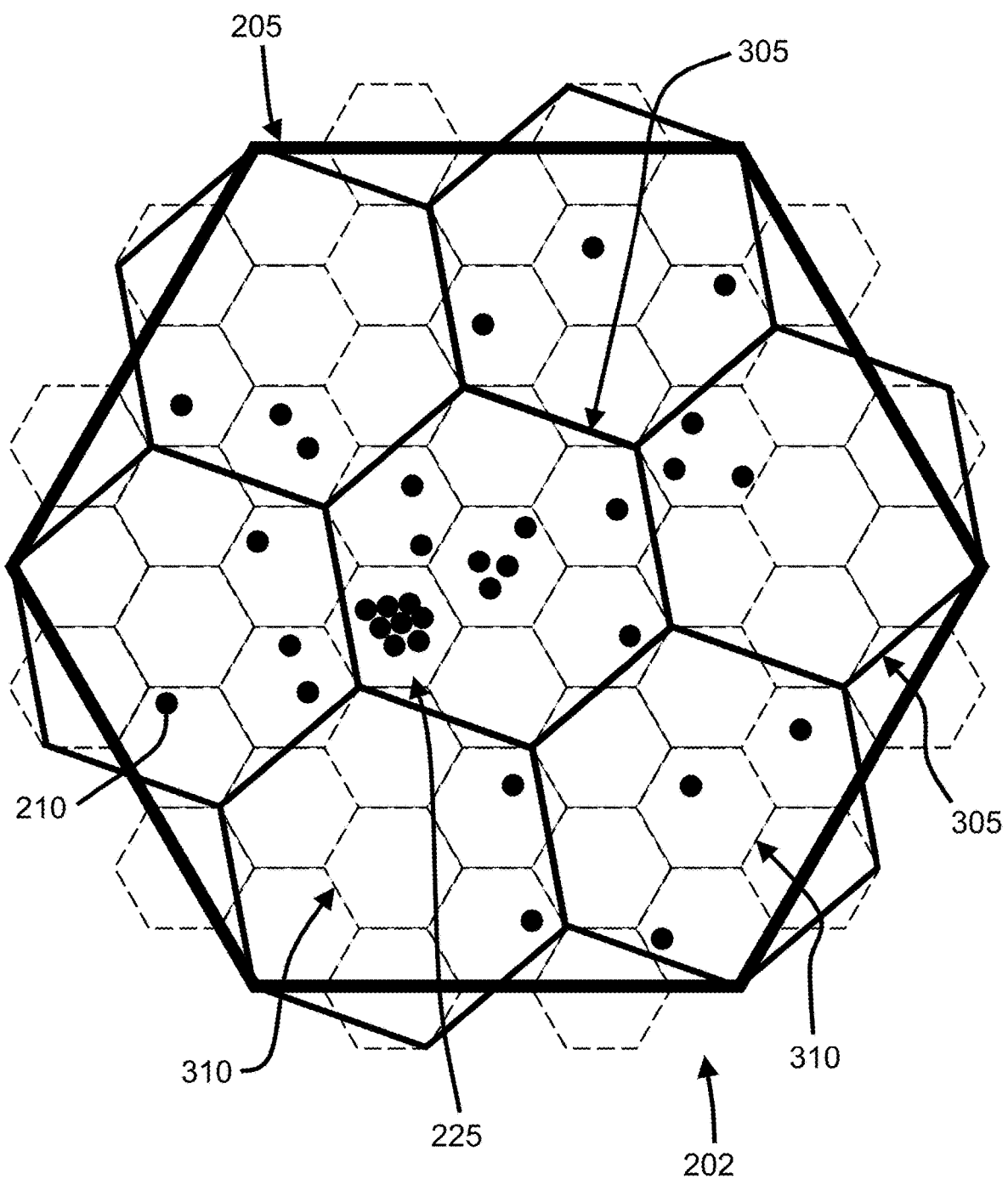
FIG. 10 is a diagram of the FIG. 3 cell according to another example.

FIG. 10 illustrates another example of the geospatial data arranged into the cell 205. As shown, the cell 205 is divided into multiple first subcell divisions 305. Further, each first subcell division 305 is divided into multiple second subcell divisions 310. Unlike in the FIG. 3 example, the first subcell divisions 305 are not perfectly contained within the cell 205 in the FIG. 10 example. Similarly, the second subcell divisions 310 are not perfectly contained within each first subcell division 305. While the first subcell divisions 305 can be shaped to have roughly the same area and to be fully contained in the cell 205 as show in FIG. 3, there are some benefits to using the hexagonal tiling as shown in FIG. 10. For example, using a hexagonal tiling allows all the first subcell divisions 305 to have the same shape and same area. In some cases, using uniformly shaped first subcell divisions 305 allows the data refiner 105 to more accurately and reliably evaluate the distribution of the data pings 210. Further, using hexagonal first subcell divisions 305 reduces spherical distortion compared to rectangular or other shaped first subcell divisions 305.

Figure 11:
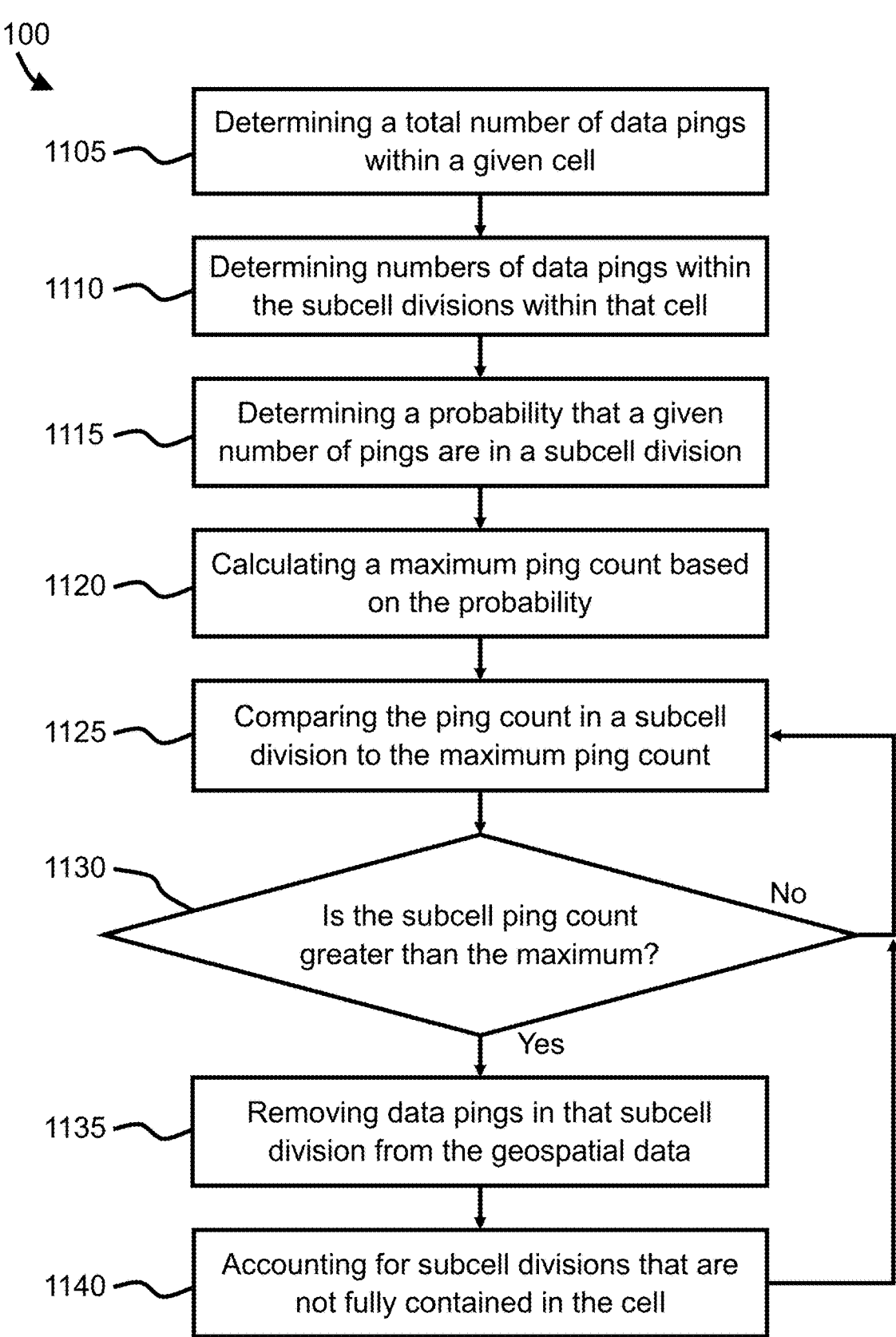
FIG. 11 is a flowchart of another technique used by the FIG. 1 system for filtering geospatial data.

Referring to FIG. 11, a flowchart 1100 represents another technique for filtering geospatial data. In one example, the data refiner 105 performs the technique shown by the flowchart 1100 when performing stage 515 of the flowchart 500 in FIG. 5. In one version, the data refiner 105 utilizes a combination of the techniques shown in the flowchart 600, the flowchart 700, and/or the flowchart 1100. As should be appreciated, the data refiner 105 is configured to utilize any combination of the techniques described in FIGS. 5, 6, 7, 8,

9, and 11. At stage 1105, the data refiner 105 determines the total number of data pings 210 within a given geographic section 202, such as within one of the cells 205. For example, the data refiner 105 performs the same actions as at stage 705 and/or stage 710 in FIG. 7.

At stage 1110, the data refiner 105 determines the number of data pings 210 within each smaller geographic section 202. For example, the data refiner 105 finds the number of data pings 210 in each first subcell division 305 within the cell 205 considered at stage 1105. As should be appreciated, the data refiner 105 is configured to perform the technique of the flowchart 700 at various resolutions, such as for the data pings 210 in each second subcell division 310 within a given first subcell division 305 and/or at other sizes of geographic sections 202. For the purpose of explanation, the technique is described at the resolution of the first subcell divisions 305 within the cell 205. The data refiner 105 performs similar actions to determine the number of data pings 210 in the first subcell division 305 at stage 1110 as used for the cell 205 at stage 1105. In some cases, considering the number of data pings 210 at each distinct location (i.e., each latitude 215 and longitude 220 pair) in the cell 205 relies on too small of a resolution to adequately catch hotspots 225 and/or other types of anomalies 222. Conversely, considering the number of data pings 210 distributed among the first subcell divisions 305 in the cell 205 utilizes a large enough resolution to reliably identify the hotspots 225 and other types of anomalies 222.

At stage 1115, the data refiner 105 determines a probability that a given number of data pings 210 are in a particular first subcell division 305. The probability is based on a comparison of the area of the cell 205 and the area of the first subcell division 305. Further, the probability is based on a binomial distribution. In other words, the probability is determined based on the successive probability of each data ping 210 being in the first subcell division 305 for a particular number of data pings 210. In one example, the successive probabilities in the binomial distribution are based on a uniform distribution. The probability is further based on the total number of data pings 210 in the cell 205.

At stage 1120, the data refiner 105 calculates a maximum ping count based on the probability. The maximum ping count represents the greatest number of data pings 210 that is expected in the first subcell division 305. In other words, the maximum ping count is the greatest number of data pings 210 in the first subcell division 305 that is still considered natural and not anomalous. In one example, the maximum ping count at each first subcell division 305 is the density threshold condition used at stage 610 in FIG. 6. The data refiner 105 typically calculates the maximum ping count by comparing the probability from stage 1115 to a probability threshold. For example, the maximum ping count is the number of data pings 210 in the probability calculation at stage 1115 that results in a probability above the probability threshold. In one example, the probability threshold is the same value used at stage 625 in FIG. 6 and/or at stage 730 in FIG. 7. For instance, the probability threshold is 95% and/or another value. The probability threshold represents the certainty that the distribution of the data pings 210 in the first subcell division 305 is natural when below the maximum ping count. Further, in one example, the data refiner 105 performs regression on the maximum ping count. For instance, the data refiner 105 estimates the maximum ping count as a function, such as a linear approximation. The function estimates the maximum ping count based on the total number of data pings 210 in the cell 205, the probability of a single data ping 210 being in a given first subcell division 305, and/or other factors.

At stage 1125, the data refiner 105 then compares the number of data pings 210 in a given first subcell division 305 to the maximum ping count. Compared to a flat filter and/or other types of probabilistic filters, the maximum ping count approach is more lenient on cells 205 with a low number of data pings 210. When the number of data pings 210 is very low, the distribution of the data pings 210 does not always follow the expected normal distribution. While not certain, it is thought that the user devices 115 are naturally more likely to be located and recorded at particular seating areas, on pathways and/or sidewalks, and/or near areas with better wireless signal reception as some examples. Other filtering techniques occasionally filter out the data pings 210 in such conditions, but the maximum ping count approach allows more flexibility for the cells 205 with a low ping count. By comparing the data pings 210 in the first subcell division 305 to the maximum ping count, the data refiner 105 ensures that the distribution of the data pings 210 within the cell 205 is accurate and not anomalous. At stage 1130, the data refiner 105 checks if the number of data pings 210 is greater than the maximum ping count. If the number of data pings 210 in the first subcell division 305 is greater than the maximum ping count, then the data refiner 105 continues to stage 1135. Otherwise, the data refiner 105 returns to stage 1125 to evaluate the number of data pings 210 at another first subcell division 305. Alternatively or additionally, the data refiner 105 uses a fixed lower ping threshold before comparing the number of data pings 210 to the maximum ping count. For example, the lower ping threshold is 10 and the first subcell divisions 305 with fewer than 10 data pings 210 are allowed to pass through the filter.

At stage 1135, the data refiner 105 removes the data pings 210 in the first subcell division 305 from the geospatial data. In one example, the data refiner 105 removes all the data pings 210 in that first subcell division 305. In another example, the data refiner 105 removes enough of the data pings 210 in the first subcell division 305 to bring the ping count below the maximum ping count. The data refiner 105 then continues to stage 1140. At stage 1140, the data refiner 105 accounts for non-containment of the first subcell divisions 305 in the cell 205. As shown in the FIG. 10 example, the first subcell divisions 305 are not always completely contained within the cell 205. In these cases, there is a risk that hotspots 225 and/or other anomalies 222 in a non-contained first subcell division 305 slip through the filter. The data refiner 105 is configured to account for this risk in a few ways. In one version, the data refiner 105 applies a flat filter to the first subcell divisions 305 in the cell 205. For instance, the data refiner 105 removes the data pings 210 from the data for the first subcell divisions 305, second subcell divisions 310, and/or other geographic sections 202 that have a ping count above a threshold. The data refiner 105 applies the flat filter in the same way as at stage 510 in FIG. 5. In one example, the threshold is 100 pings or higher. In another example, the threshold is a lower ping count, such as 5, 10, or 20 pings as examples. In another version, the data refiner 105 applies a dynamic multi-pass filter on the cell 205 and then on the first subcell divisions 305 in the cell 205. For instance, the data refiner 105 utilizes one or more parts of the technique illustrated in FIG. 8. Correcting for non-containment in these ways allows the data refiner 105 to effectively remove anomalous data without overcomplicating the filtering techniques. In one example, the data refiner 105 performs the actions of stage 1140 during other stages and/or at another point in the flowchart 1100. In the illustrated example, the data refiner 105 continues to stage 1125 to evaluate the ping count in another first subcell division 305. Alternatively, the data refiner 105 accounts for the non-containment of the first subcell divisions 305 after checking the ping count in each first subcell division 305. As noted, the data refiner 105 is configured to filter the data pings 210 based on the counts in each second subcell division 310 within a given first subcell division 305 and/or at other resolutions.

In one example, the data refiner 105 further accounts for multiple observations of the same user device 115. In some instances, the data refiner 105 considers all observations over a certain period, such as a day, when determining the number of data pings 210 and filtering for anomalies 222. Oftentimes, the data includes multiple data pings 210 that are recorded from the same user device 115, such as from a user sitting for some time, waiting in line, and/or otherwise staying within a small proximity over time. In one example, the data refiner 105 determines the unique number of user devices 115 that are represented in the geospatial data. For instance, the data refiner 105 determines the unique device count in a given cell 205, first subcell division 305, and/or other geographic section 202 across a certain period of time. The data refiner 105 then filters the data pings 210 only from the unique user devices 115 and the ping counts are based on the unique user devices 115. Because it is likely that users stay in one location for periods of time, filtering based on unique device counts rather than all observations is typically more effective for removing anomalous data. Further, the data refiner 105 is configured to perform the filtering at various intervals in time. In one example, the data refiner 105 performs the filtering daily and/or over another period of time. Alternatively or additionally, the data refiner 105 filters and aggregates the geospatial data over a longer period of time, such as aggregating daily filtering across a month. In another example, the data refiner 105 continually aggregates daily filtering across a rolling thirty-day period. In some cases, anomalies 222 accumulate over longer periods of time. Aggregating and filtering the geospatial data over longer periods of time, such as on a monthly basis, removes anomalies 222 that do not appear on daily and/or other shorter timeframes.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Algorithm" generally refers to a sequence of instructions to solve a problem or to perform a task, such as a calculation. Typically, algorithms are implemented on computers. An algorithm on a computer may be used to automate a desired process or task on that computer or across multiple computers and/or other devices. As examples, a computer may utilize an algorithm to make a prediction based on data, control a robotic device to move along a desired path, and/or calculate the solution to an equation. A human may determine the instructions of an algorithm and program the algorithm onto a computer or other device. In some cases, a computer or other machine may determine at least part of an algorithm. For example, an artificial intelligence system may determine an algorithm for performing a desired task. Additionally, algorithms, such as machine learning algorithms, may be utilized to teach an artificial intelligence system to create new algorithms or improve existing algorithms for performing desired tasks.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Artificial intelligence" or "AI" generally refers to the ability of machines to perceive, synthesize, and/or infer information. AI may enable a machine to perform tasks which normally require human intelligence. For example, AI may be configured for speech recognition, visual perception, decision making, language interpretation, logical reasoning, and/or moving objects. Typically, AI is embodied as a model of one or more systems that are relevant to tasks that a machine is configured to perform. AI models may be implemented on a device, such as a mechanical machine, an electrical circuit, and/or a computer. AI models may be implemented in an analog or digital form and may be implemented on hardware or software. The implementation of AI may also utilize multiple devices which may be connected in a network.

"Artificial Intelligence Model" or "AI Model" generally refers to a technology or architecture that integrates advanced features, often incorporating artificial intelligence, deep learning, automation, and/or data analytics, to improve performance, efficiency, and user experience. AI models are designed to adapt, learn, and/or optimize behaviors based on the data collected and analyzed, enabling the AI models to make more informed decisions and better support users. AI models are used in various applications, including robotic facilities, smart factories, smart warehouses, smart homes, smart cities, autonomous transportation, smart energy management, and/or smart healthcare among others.

"Cellular Device" generally refers to a device which sends or receives data, and/or sends or receives telephone calls using a cellular network. Cellular devices may thus be characterized as nodes in a communications link operating as an originating and/or final receiving node. A cellular device transmits to and receives from a cellular transceiver located in the cell (e.g. at a base unit or "cell tower.") Radio waves are generally used to transfer signals to and from the cellular device on a frequency that is specific (but not necessarily unique) to each cell. A cellular device may include a computer with memory, processor, display device, input/output devices, and so forth, and thus may be used as, and referred to as, a personal computing device.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour. Data may be organized and represented in a structured format. Examples include a tabular representation using rows and columns, a tree representation with a set of nodes considered to have a parent-children relationship, or a graph representation as a set of connected nodes to name a few. The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Geolocation" or "Geopositioning" generally refers identifying the location of, or the location itself of, a "real-world" or "physical" geographic location or location of an object, such as a position on the globe, the position of a topographical feature, a building, a particular source of electromagnetic radiation, a mobile phone or a network-connected computer. Thus geolocation may be used as a verb referring to the practice of assessing the physical location, or in the noun form as the actual assessed location itself. In this usage, geolocation can refer to the latitude and longitude coordinates of a particular location as defined by ISO/IEC 19762-5:2008. Geolocation is closely related to the use of positioning systems such as the Global Positioning System (GPS) and may include determining a recognizable location coordinate (e.g., a street address) rather than just a set of geographic coordinates. A geolocation/geopositioning module, engine, or device may use any suitable positioning system or positioning technology. For example a geolocation module may use radio frequency (RF) location methods, such as Multilateration or Time Difference Of Arrival (TDOA) to geolocate an object. GPS is an example of a TDOA geolocation system. TDOA systems often utilize mapping displays or other geographic information system. When a GPS signal is unavailable, geolocation modules may use cellular signal data associated with a mobile device obtained from cell towers to triangulate the approximate position of the mobile device, a method that may not be as accurate as GPS. This is in contrast to earlier radiolocation technologies, for example Direction Finding where a line of bearing to a transmitter is achieved as part of the process. A geolocation module or engine may also rely on internet and computer geolocation that may be performed by associating a geographic location with the Internet Protocol (IP) address, MAC address, RFID, hardware embedded article/production number, embedded software number (such as UUID, Exif/IPTC/XMP or modern steganography), invoice, Wi-Fi positioning system, device fingerprint, canvas fingerprinting or device GPS coordinates, or other, perhaps self-disclosed information. Network geolocation may work by automatically looking up an IP address on a WHOIS service and retrieving the registrant's physical address. IP address location data can include information such as country, region, city, postal/zip code, latitude, longitude and time zone. Deeper data sets can determine other parameters such as domain name, connection speed, ISP, language, proxies, company name, Designated Market Area (DMA), Metro Survey Areas (MSA), North American Industry Classification System (NAICS) codes, and home/business.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Mobile Device" generally refers to a piece of portable electronic equipment that can connect to a network such as a wireless network, a mobile network, and/or the internet. For instance, a mobile device can include a smartphone or tablet computer.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, 4G, or 5G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards. The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA. In another example, the processor uses a Reduced Instruction Set Computing (RISC) architecture, such as an Advanced RISC Machine (ARM) type processor developed and licensed by ARM Holdings of Cambridge, United Kingdom. In still yet other examples, the processor can include a Central Processing Unit (CPU) and/or an Accelerated Processing Unit (APU), such as those using a K8, K10, Bulldozer, Bobcat, Jaguar, and Zen series architectures, supplied by Advanced Micro Devices, Inc. (AMD) of Santa Clara, California. Another example of a processor is an Application-Specific Integrated Circuit (ASIC). An ASIC is an Integrated Circuit (IC) customized to perform a specific series of logical operations for controlling the computer to perform specific tasks or functions. An ASIC is an example of a processor for a special purpose computer, rather than a processor configured for general-purpose use. An application-specific integrated circuit generally is not reprogrammable to perform other functions and may be programmed once it is manufactured. In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. An FPGA may be programmed to perform a specific series of instructions which may be retained in nonvolatile memory cells in the FPGA. The FPGA may be configured by a customer or a designer using a Hardware Description Language (HDL). An FPGA may be reprogrammed using another computer to reconfigure the FPGA to implement a new set of commands or operating instructions. Such an operation may be executed in any suitable means such as by a firmware upgrade to the processor circuitry. Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g., "true" or "false"). Processing activities may occur in multiple single processors on separate servers, on multiple processors in a single server with separate processors, or on multiple processors physically remote from one another in separate computing devices.

"Satellite Navigation" generally refers to a system that uses satellites to provide geo-spatial positioning data. In one example, the system may include a receiver that interacts with satellites using electromagnetic radiation. The timing of the transmission of the signal from the receiver to the satellites allows calculation of the position of the receiver using triangulation. Some of examples of satellite navigation systems include global positioning systems such as GPS and GLONASS as well as global positioning systems under development such as Galileo. A satellite navigation system may also be a regional positioning system such as BeiDou, NAVIC, and QZSS.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 system
105 data refiner
110 network
115 user device
120 third-party data broker
125 operating system
200 map
202 geographic section
205 cell
210 data ping
215 latitude
220 longitude
222 anomaly
225 hotspot
305 first subcell division
310 second subcell division
405 processor
410 memory
415 long-term storage device
420 networking device
500 flowchart
505 stage
510 stage
515 stage
520 stage
525 stage
600 flowchart
605 stage
610 stage
615 stage
620 stage
625 stage
630 stage
700 flowchart
705 stage
710 stage
715 stage
720 stage
725 stage
730 stage
735 stage
800 flowchart
805 stage
810 stage
815 stage
820 stage
900 flowchart
905 stage
910 stage
915 stage
920 stage
1100 flowchart
1105 stage
1110 stage
1115 stage 1120 stage
1125 stage
1130 stage
1135 stage
1140 stage

What is claimed is:

1. A method, comprising:

receiving at a data refiner geospatial data from a third-party data broker;

wherein the data refiner includes a computer;

wherein the geospatial data includes multiple data pings;

wherein each data ping includes a location for a user device;

determining the data pings for a cell in the geospatial data satisfies a threshold with the data refiner;

wherein the cell represents a geographic area within the geospatial data;

analyzing the data pings in a subcell of the cell with the data refiner in response to the determining the data pings for the cell in the geospatial data satisfies the threshold;

wherein the subcell is located within the cell;

wherein the subcell has a smaller area than the cell;

calculating a density threshold condition for the subcell with the data refiner;

wherein the density threshold condition represents a realistic number of the data pings observed within the subcell;

wherein the density threshold condition is a maximum ping count for the subcell;

counting a ping count of the data pings in the subcell with the data refiner;

determining the ping count in the subcell exceeds the maximum ping count for the subcell with the data refiner;

removing the data pings in the subcell from the geospatial data to have the ping count in the subcell to be at most the maximum ping count with the data refiner; and wherein the removing the data pings in the subcell from the geospatial data occurs in response to the determining the ping count in the subcell exceeds the maximum ping count.

2. The method of claim 1, further comprising:

performing regression on the density threshold condition.

3. The method of claim 1, wherein the subcell within the cell includes a location centered on a particular latitude and longitude pairing.

4. The method of claim 1, further comprising:

passing the geospatial data through a flat filter;

wherein the flat filter removes data pings at locations where the number of data pings is above a ping threshold; and wherein the ping threshold is above 100 data pings.

5. The method of claim 1, wherein the removing the data pings in the subcell from the geospatial data includes removing all of the data pings in the subcell.

6. A method, comprising:

receiving at a data refiner geospatial data from a third-party data broker over a network;

wherein the data refiner includes a computer;

wherein the geospatial data includes multiple data pings;

wherein each data ping includes a location for a user device;

passing the geospatial data through a first filter as a first pass with the data refiner;

determining the data pings for a cell in the geospatial data passes the first filter in the first pass;

wherein the cell represents a geographic area within the geospatial data;

passing the geospatial data for a subcell through a second filter as a second pass with the data refiner;

wherein the subcell is located within the cell;

wherein the subcell has a smaller area than the cell;

determining the data pings for the subcell in the geospatial data passes the second filter in the second pass;

passing the geospatial data for a subdivision of the subcell through a third filter as a third pass with the data refiner;

wherein the subdivision is located within the subcell;

wherein the subdivision has a smaller area than the subcell;

determining the subdivision fails to pass the third filter in the third pass with the data refiner; and removing the data pings in the subdivision from the geospatial data to have the count of data pings in the subdivision to be at most a maximum ping count with the data refiner in response to the determining the subdivision fails to pass the third filter.

7. The method of claim 6, wherein determining the subdivision fails to pass the third filter includes calculating a probability that the data pings at the subdivision are above a probability threshold.

8. The method of claim 7, further comprising:

calculating a density threshold condition on the third pass of the third filter;

wherein the density threshold condition represents a limit on the density of data pings in a geographic area; and wherein the probability is calculated based on the density threshold condition.

9. The method of claim 8, further comprising:

comparing the data pings within the subdivision to an expected distribution of data pings.

10. The method of claim 6, wherein the third-party data broker aggregates geospatial data for multiple user devices from multiple sources.

11. The method of claim 6, wherein the removing the data pings in the subdivision from the geospatial data includes removing all of the data pings in the subdivision.

* * * * *